US012794521B2

(12) United States Patent
Lee et al.

(10) Patent No.: US 12,794,521 B2
(45) Date of Patent: Nov. 10, 2026

(54) TECHNIQUES FOR CONTROL SIGNALING FOR CLOSED-LOOP ANTENNA SELECTION

(71) Applicant: QUALCOMM Incorporated, San Diego, CA (US)

(72) Inventors: Hyojin Lee, San Diego, CA (US); Yu Zhang, San Diego, CA (US); Jing Jiang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 18/791,059

(22) Filed: Jul. 31, 2024

(65) Prior Publication Data

US 2026/0039339 A1 Feb. 5, 2026

(51) Int. Cl.

| | |
|---|---|
| ***H04B 7/02*** | (2018.01) |
| ***H04B 7/0456*** | (2017.01) |
| *H04W 72/232* | (2023.01) |

(52) U.S. Cl.

CPC ......... *H04B 7/0456* (2013.01); *H04W 72/232* (2023.01)

(58) Field of Classification Search

CPC .. H04B 7/0456; H04B 7/0691; H04B 7/0404; H04W 72/232

USPC .......................................................... 375/267

See application file for complete search history.

(56) References Cited

U.S. PATENT DOCUMENTS

| | | | | |
|---|---|---|---|---|
| 2008/0014892 A1* | 1/2008 | Aldana | ................ | H04B 7/0874 455/277.1 |
| 2023/0081552 A1 | 3/2023 | Chou et al. | | |
| 2023/0163820 A1* | 5/2023 | El-Keyi | ............... | H04B 7/0482 370/329 |
| 2023/0171766 A1 | 6/2023 | Lin et al. | | |

OTHER PUBLICATIONS

International Search Report and Written Opinion—PCT/US2025/035236—ISA/EPO—Sep. 19, 2025.

* cited by examiner

*Primary Examiner* — Helene E Tayong

(74) *Attorney, Agent, or Firm* — Harrity & Harrity, LLP

(57) ABSTRACT

Various aspects of the present disclosure generally relate to wireless communication. In some aspects, a network node may receive one or more uplink reference signals that are associated with a plurality of antennas at a user equipment (UE). The network node may transmit an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals. Numerous other aspects are described.

26 Claims, 11 Drawing Sheets

TECHNIQUES FOR CONTROL SIGNALING FOR CLOSED-LOOP ANTENNA SELECTION

FIELD OF THE DISCLOSURE

Aspects of the present disclosure generally relate to wireless communication and specifically relate to techniques, apparatuses, and methods for control signaling for closed-loop antenna selection.

DESCRIPTION OF RELATED ART

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a network node. The method may include receiving one or more uplink reference signals that are associated with a plurality of antennas at a user equipment (UE). The method may include transmitting an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals.

Some aspects described herein relate to a method of wireless communication performed by a UE. The method may include transmitting one or more uplink reference signals that are based at least in part on a plurality of antennas at the UE. The method may include receiving an indication of a network-node-based uplink antenna selection for the UE, the network-node-based uplink antenna selection being linked to specific precoding assigned to a future uplink transmission and being based at least in part on the one or more uplink reference signals. The method may include receiving an uplink grant that is assigned to the UE for the future uplink transmission and indicates the specific precoding. The method may include transmitting the future uplink transmission using the specific precoding, the network-node-based uplink antenna selection, and the uplink grant.

Some aspects described herein relate to a method of wireless communication performed by a network node. The method may include receiving an indication of a UE capability that indicates an antenna switching time delay of a UE that is associated with switching to a network-node-based uplink antenna selection. The method may include receiving an uplink transmission based at least in part on the antenna switching time delay.

Some aspects described herein relate to a method of wireless communication performed by a UE. The method may include transmitting an indication of a UE capability that indicates an antenna switching time delay of the UE that is associated with switching to a network-node-based uplink antenna selection. The method may include transmitting a future uplink transmission based at least in part on the antenna switching time delay and using the network-node-based uplink antenna selection.

Some aspects described herein relate to an apparatus for wireless communication at a network node. The apparatus may include one or more memories and one or more processors coupled to the one or more memories. The one or more processors may be configured, individually or collectively, to receive one or more uplink reference signals that are associated with a plurality of antennas at a UE. The one or more processors may be configured, individually or collectively, to transmit an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals.

Some aspects described herein relate to an apparatus for wireless communication at a UE. The apparatus may include one or more memories and one or more processors coupled to the one or more memories. The one or more processors may be configured, individually or collectively, to transmit one or more uplink reference signals that are based at least in part on a plurality of antennas at the UE. The one or more processors may be configured to receive an indication of a network-node-based uplink antenna selection for the UE, the network-node-based uplink antenna selection being linked to specific precoding assigned to a future uplink transmission and being based at least in part on the one or more uplink reference signals. The one or more processors may be configured, individually or collectively, to receive an uplink grant that is assigned to the UE for the future uplink transmission and indicates the specific precoding. The one or more processors may be configured, individually or collectively, to transmit the future uplink transmission using the specific precoding, the network-node-based uplink antenna selection, and the uplink grant.

Some aspects described herein relate to an apparatus for wireless communication at a network node. The apparatus may include one or more memories and one or more processors coupled to the one or more memories. The one or more processors may be configured, individually or collectively, to receive an indication of a UE capability that indicates an antenna switching time delay of a UE that is associated with switching to a network-node-based uplink antenna selection. The one or more processors may be configured, individually or collectively, to receive an uplink transmission based at least in part on the antenna switching time delay.

Some aspects described herein relate to an apparatus for wireless communication at a UE. The apparatus may include one or more memories and one or more processors coupled to the one or more memories. The one or more processors may be configured, individually or collectively, to transmit an indication of a UE capability that indicates an antenna switching time delay of the UE that is associated with switching to a network-node-based uplink antenna selection. The one or more processors may be configured, individually or collectively, to transmit a future uplink transmission based at least in part on the antenna switching time delay and using the network-node-based uplink antenna selection.

Some aspects described herein relate to a non-transitory computer-readable medium that stores a set of instructions for wireless communication by a network node. The set of instructions, when executed by one or more processors of the network node, may cause the network node to receive one or more uplink reference signals that are associated with a plurality of antennas at a UE. The set of instructions, when executed by one or more processors of the network node, may cause the network node to transmit an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals.

Some aspects described herein relate to a non-transitory computer-readable medium that stores a set of instructions for wireless communication by a UE. The set of instructions, when executed by one or more processors of the UE, may cause the UE to transmit one or more uplink reference signals that are based at least in part on a plurality of antennas at the UE. The set of instructions, when executed by one or more processors of the UE, may cause the UE to receive an indication of a network-node-based uplink antenna selection for the UE, the network-node-based uplink antenna selection being linked to specific precoding assigned to a future uplink transmission and being based at least in part on the one or more uplink reference signals. The set of instructions, when executed by one or more processors of the UE, may cause the UE to receive an uplink grant that is assigned to the UE for the future uplink transmission and indicates the specific precoding. The set of instructions, when executed by one or more processors of the UE, may cause the UE to transmit the future uplink transmission using the specific precoding, the network-node-based uplink antenna selection, and the uplink grant.

Some aspects described herein relate to a non-transitory computer-readable medium that stores a set of instructions for wireless communication by a network node. The set of instructions, when executed by one or more processors of the network node, may cause the network node to receive an indication of a UE capability that indicates an antenna switching time delay of a UE that is associated with switching to a network-node-based uplink antenna selection. The set of instructions, when executed by one or more processors of the network node, may cause the network node to receive an uplink transmission based at least in part on the antenna switching time delay.

Some aspects described herein relate to a non-transitory computer-readable medium that stores a set of instructions for wireless communication by a UE. The set of instructions, when executed by one or more processors of the UE, may cause the UE to transmit an indication of a UE capability that indicates an antenna switching time delay of the UE that is associated with switching to a network-node-based uplink antenna selection. The set of instructions, when executed by one or more processors of the UE, may cause the UE to transmit a future uplink transmission based at least in part on the antenna switching time delay and using the network-node-based uplink antenna selection.

Some aspects described herein relate to an apparatus for wireless communication. The apparatus may include means for receiving one or more uplink reference signals that are associated with a plurality of antennas at a UE. The apparatus may include means for transmitting an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals.

Some aspects described herein relate to an apparatus for wireless communication. The apparatus may include means for transmitting one or more uplink reference signals that are based at least in part on a plurality of antennas at the UE. The apparatus may include means for receiving an indication of a network-node-based uplink antenna selection for the UE, the network-node-based uplink antenna selection being linked to specific precoding assigned to a future uplink transmission and being based at least in part on the one or more uplink reference signals. The apparatus May include means for receiving an uplink grant that is assigned to the UE for the future uplink transmission and indicates the specific precoding. The apparatus may include means for transmitting the future uplink transmission using the specific precoding, the network-node-based uplink antenna selection, and the uplink grant.

Some aspects described herein relate to an apparatus for wireless communication. The apparatus may include means for receiving an indication of a UE capability that indicates an antenna switching time delay of a UE that is associated with switching to a network-node-based uplink antenna selection. The apparatus may include means for receiving an uplink transmission based at least in part on the antenna switching time delay.

Some aspects described herein relate to an apparatus for wireless communication. The apparatus may include means for transmitting an indication of a UE capability that indicates an antenna switching time delay of a UE that is associated with switching to a network-node-based uplink antenna selection. The apparatus may include means for transmitting a future uplink transmission based at least in part on the antenna switching time delay and using the network-node-based uplink antenna selection.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
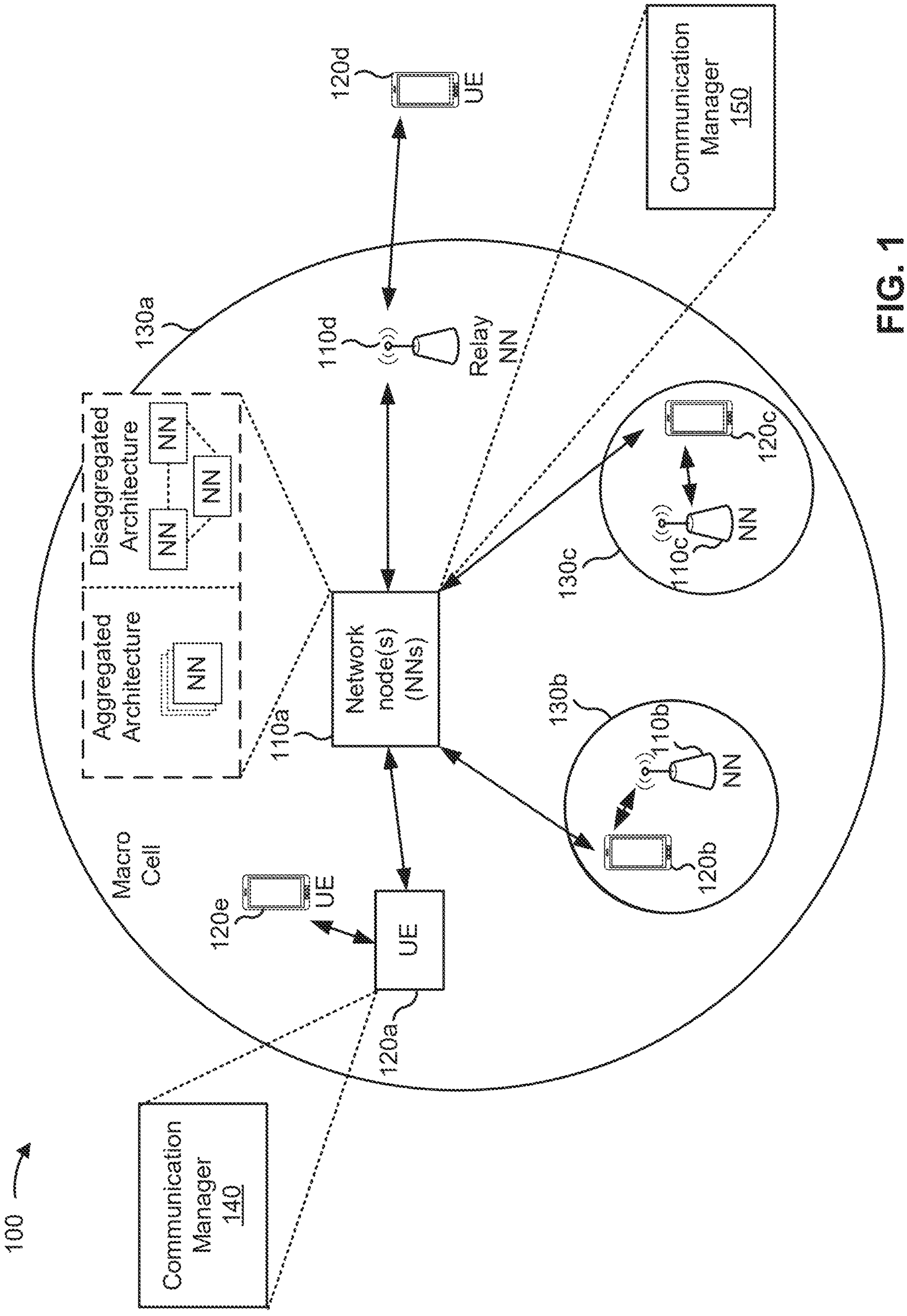
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A wireless communication device, such as a network node or a user equipment (UE), may include fewer transmission chains than antennas, and the wireless communication device may also include a capability to switch connections between a transmission chain and an antenna. For instance, the wireless communication device may decouple a transmission chain from a first antenna and couple the transmission chain to a second antenna. The ability for a wireless communication device to switch and/or change connections between transmission chains and antennas may enable the wireless communication device to dynamically select and/or switch an antenna configuration (e.g., one or more antennas out of a set of antennas) that results in a higher signal quality relative to using a different antenna configuration. Examples of a higher signal quality may include a first signal with a higher signal power level, a lower interference level, and/or a higher signal-to-noise ratio (SNR) relative to a second signal. To determine a best antenna configuration out of a set of antennas, the wireless communication device may use and/or analyze a variety of factors, such as a per-antenna transmit power budget and/or one or more propagation channel characteristics of a channel between a transmitting wireless communication device and a receiving wireless communication device (e.g., a UE and a network node, respectively, for an uplink channel).

A UE may perform uplink antenna selection in an open-loop manner that is transparent to a network node. For example, the UE may compute one or more measurements based at least in part on receiving one or more downlink signals, generating a measurement metric using each downlink signal/antenna combination, and comparing the measurement metrics to determine which antenna and/or antenna configuration is linked to a higher signal quality. Based at least in part on an assumption that at least some reciprocity exists between a downlink channel and an uplink channel, the UE may select an uplink antenna configuration using the antenna that produces a higher signal quality for a downlink signal. However, reciprocity between the uplink channel and the downlink channel may not exist, resulting in the UE selecting an antenna configuration that is sub-optimal and/or produces a decreased signal quality (e.g., reduced signal power level and/or reduced SNR). The decreased signal quality may lead to increased recovery errors, increased data transfer delays, and/or decreased data throughput in a wireless network.

Closed-loop antenna selection (CLAS) may include a network node selecting an uplink antenna configuration for a UE based at least in part on uplink signaling between a UE and a network node. For instance, the network node may select an uplink antenna configuration by reusing an uplink multiple-input multiple output (MIMO) architecture that uses codebook-based (CB) uplink MIMO signaling and/or non-codebook-based (NCB) uplink MIMO signaling. However, a network node reusing an uplink MIMO architecture and uplink MIMO signaling (e.g., CB uplink MIMO signaling and/or NCB uplink MIMO signaling) to perform CLAS may lack flexibility and/or support for various chain-antenna structures. To illustrate, uplink MIMO architecture in combination with CB uplink MIMO signaling for uplink antenna selection may only be used for antenna selection between a limited number of connections, each of which uses a separate reference signal resource (e.g., a sounding reference signal (SRS) resource) for the antenna selection, and the uplink MIMO architecture in combination with NCB uplink MIMO signaling may only allow the network node to perform an uplink antenna selection for a non-coherent antenna selection architecture and/or a fully connected antenna selection architecture since precoding selection capability (which does not have any selection constraint) is replaced by an antenna selection capability. Alternatively, or additionally, CLAS that uses the uplink MIMO architecture and uplink MIMO signaling may only be applicable to UEs that support fast dynamic antenna switching and/or may not be applicable to UEs that do not support fast dynamic antenna switching. Accordingly, a network node reusing an uplink MIMO architecture and uplink MIMO signaling for uplink antenna selection may not be supported by a wide variety of UEs, resulting in at least some UEs using a sub-optimal uplink antenna configuration, such as an uplink antenna configuration that is based at least in part on assuming reciprocity between an uplink channel and a downlink channel.

Various aspects relate generally to control signaling for closed-loop antenna selection. Some aspects more specifically relate to a network node selecting an uplink antenna configuration for a UE, and the uplink antenna configuration may be linked to specific precoding and/or a future uplink transmission that uses the specific precoding. In some aspects, a network node may receive one or more uplink reference signals that are associated with a plurality of antennas at a UE. To illustrate, the UE may transmit a first uplink reference signal (and/or a first portion of a reference signal) using a first antenna of the plurality of antennas) and a second uplink reference signal (and/or a second portion of the reference signal) using a second antenna of the plurality of antennas. Accordingly, the uplink reference signal(s) may be iteratively transmitted by the UE using a respective antenna of the plurality of antennas. Based at least in part on receiving the uplink reference signal(s), the network node may transmit an indication of a network-node-based uplink antenna selection for the UE. In some aspects, the network-node-based uplink antenna selection may be linked to (e.g., associated with) specific precoding (e.g., out of multiple different precodings) that is assigned to a future uplink transmission. For example, the network node may indicate to use the network-node-based uplink antenna selection for a future uplink transmission that is assigned the specific precoding. Accordingly, the linkage between the network-node-based uplink antenna selection and the specific precoding may be based at least in part on an instruction and/or a recommendation to use the network-node-based uplink antenna selection for a future uplink transmission that is assigned the specific precoding. Alternatively, or additionally, the network-node-based uplink antenna selection may be based at least in part on the one or more uplink reference signals. To illustrate, the network node may generate a respective measurement metric using each reference signal transmitted by the UE, and each reference signal may be associated with a respective transmit antenna at the UE. The network node may use the measurement metric(s) to determine the network-node-based uplink antenna selection, such as by selecting an antenna that is associated with the highest measurement metric in a set of measurement metrics.

In some aspects, a UE may transmit one or more uplink reference signals that are based at least in part on a plurality of antennas at the UE, such as by transmitting each reference signal (and/or a respective portion of a reference signal) using a respective antenna in the plurality of antennas. Based at least in part on transmitting the one or more reference signals, the UE may receive an indication of a network-node-based uplink antenna selection for the UE. In some aspects, the network-node-based uplink antenna selection may be linked (e.g., associated with) specific precoding that is assigned to a future uplink transmission. Alternatively, or additionally, the network-node-based uplink antenna selection may be based at least in part on the one or more uplink reference signals, as described herein. The UE may receive an uplink grant that is assigned to the UE for the future uplink transmission, and the uplink grant may indicate to use the specific precoding for the future uplink transmission. Accordingly, the UE may transmit the future uplink transmission using the specific precoding, the network-node-based uplink antenna selection, and the uplink grant.

Particular aspects of the subject matter described in this disclosure can be implemented to realize one or more of the following potential advantages. In some examples, by indicating a network-node-based uplink antenna selection that is linked to specific precoding, the described techniques can be used to mitigate signal degradation that is associated with a UE using downlink measurement metrics to select an uplink antenna configuration in a scenario that includes a lack of reciprocity between a downlink channel and an uplink channel. Instead, a network node may select the antenna configuration based at least in part on one or more reference signals that use an existing uplink channel between the network node and a UE. Mitigating such signal degradation may result in an antenna configuration that is associated with a higher signal quality (e.g., a higher signal power level and/or a lower interference power level), leading to reduced recovery errors, reduced data transfer delays, and/or increased data throughput in a wireless network.

The use of a network-node-based uplink antenna selection that is linked to specific precoding may also be supported by a larger variety of UEs, relative to reuse of an uplink MIMO framework. The ability for a network node to select an uplink antenna configuration in a manner that is supported by a larger variety of UEs may mitigate signal degradation in a wireless network by reducing the number of UEs selecting a sub-optimal antenna configuration using a downlink measurement metric, resulting in reduced recovery errors, reduced data transfer delays, and/or increased data throughput in the wireless network.

A network node selecting an uplink antenna configuration for a UE, where the uplink antenna configuration is linked to specific precoding, may change uplink transmission timing at a UE. To illustrate, a physical uplink shared channel (PUSCH) preparation time is a duration that is used by a UE to prepare a PUSCH transmission, where the PUSCH preparation time may be based at least in part on the UE receiving an uplink grant for the PUSCH transmission. A duration of the PUSCH preparation time may vary based at least in part on a transmission configuration, such as whether a bandwidth part (BWP) switch is occurring, whether an uplink carrier switch is occurring, and/or whether a first symbol of a PUSCH allocation is demodulation reference signal (DMRS) only or not. At times, a network node may iteratively select and/or update a network-node-based uplink antenna selection. Accordingly, using a network-node-based uplink antenna selection may result in the UE changing from a first uplink antenna configuration to a second uplink antenna configuration between uplink transmissions (e.g., between PUSCH transmissions). Without including a preparation time for changing antenna configurations (e.g., a re-tuning time that allows hardware to settle and/or a blanking time that mitigates interference), the UE may use a PUSCH preparation time that results in the UE transmitting an uplink signal that has degraded signal quality (e.g., due to unsettled hardware) and/or may generate interference in other communications (e.g., time division duplexing (TDD) communications and/or inter-band carrier aggregation communications). The degraded signal quality and/or increased interference may result in increased recovery errors, increased data transfer delays, and/or decreased data throughput in a wireless network.

In some aspects, a network node may receive an indication of a UE capability that specifies an antenna switching time delay of the UE. For example, the antenna switching time delay may be associated with the UE switching from using a first network-node-based uplink antenna selection (e.g., a first uplink antenna configuration) to using a second network-node-based uplink antenna connection (e.g., a second uplink antenna configuration). Alternatively, or additionally, the antenna switching time delay may be based at least in part on a re-tuning delay that allows hardware at the UE to settle to within a target percentage and/or a blanking delay that mitigates interference generated by the UE. In some aspects, the network node may receive a future uplink transmission that is based at least in part on the antenna switching time delay. To illustrate, the network node may identify that a network-node-based uplink antenna selection results in the UE changing an uplink antenna configuration. Accordingly, the network node may calculate an uplink transmission time for a future uplink transmission that is based at least in part on the antenna switching time delay. For instance, the network node may select an uplink grant for the future uplink transmission and/or may calculate a reception time for the future uplink transmission after expiration of the antenna switching time delay.

By indicating an antenna switching time delay, the UE may enable synchronized communications with the network node that mitigate signal degradation that is due to unsettled hardware. That is, the indication and/or use of the antenna switching time delay may ensure a smooth transition (e.g., hardware settling) between uplink antenna configurations and/or mitigate interference by the UE in other communications. Mitigating signal degradation and/or interference may result in decreased recovery errors, decreased data transfer delays, and/or increased data throughput in a wireless network.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform multiple-input multiple-output (MIMO) communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a network node (e.g., a network node 110) may include a communication manager 150. As described in more detail elsewhere herein, the communication manager 150 may receive one or more uplink reference signals that are associated with a plurality of antennas at a UE; and transmit an indication of a network-node-based uplink antenna selection for the UE, the network-node-based uplink antenna selection being linked to (e.g., associated with) specific precoding assigned to a future uplink transmission, the network-node-based uplink antenna selection being based at least in part on the one or more uplink reference signals.

Additionally, or alternatively, the communication manager 150 may receive an indication of a UE capability that indicates an antenna switching time delay of a UE that is associated with switching to a network-node-based uplink antenna selection; and receive an uplink transmission based at least in part on the antenna switching time delay. Additionally, or alternatively, the communication manager 150 may perform one or more other operations described herein.

In some aspects, a UE (e.g., a UE 120) may include a communication manager 140. As described in more detail elsewhere herein, the communication manager 140 may transmit one or more uplink reference signals that are based at least in part on a plurality of antennas at the UE; receive an indication of a network-node-based uplink antenna selection for the UE, the network-node-based uplink antenna selection being linked to specific precoding assigned to a future uplink transmission and being based at least in part on the one or more uplink reference signals; and receive an uplink grant that is assigned to the UE for the future uplink transmission and indicates the specific precoding; and transmit the future uplink transmission using the specific precoding, the network-node-based uplink antenna selection, and the uplink grant.

Additionally, or alternatively, the communication manager 140 may transmit an indication of a UE capability that indicates an antenna switching time delay of the UE that is associated with switching to a network-node-based uplink antenna selection; and transmit a future uplink transmission based at least in part on the antenna switching time delay and using the network-node-based uplink antenna selection. Additionally, or alternatively, the communication manager 140 may perform one or more other operations described herein.

As indicated above, FIG. 1 is provided as an example. Other examples may differ from what is described with regard to FIG. 1.

Figure 2:
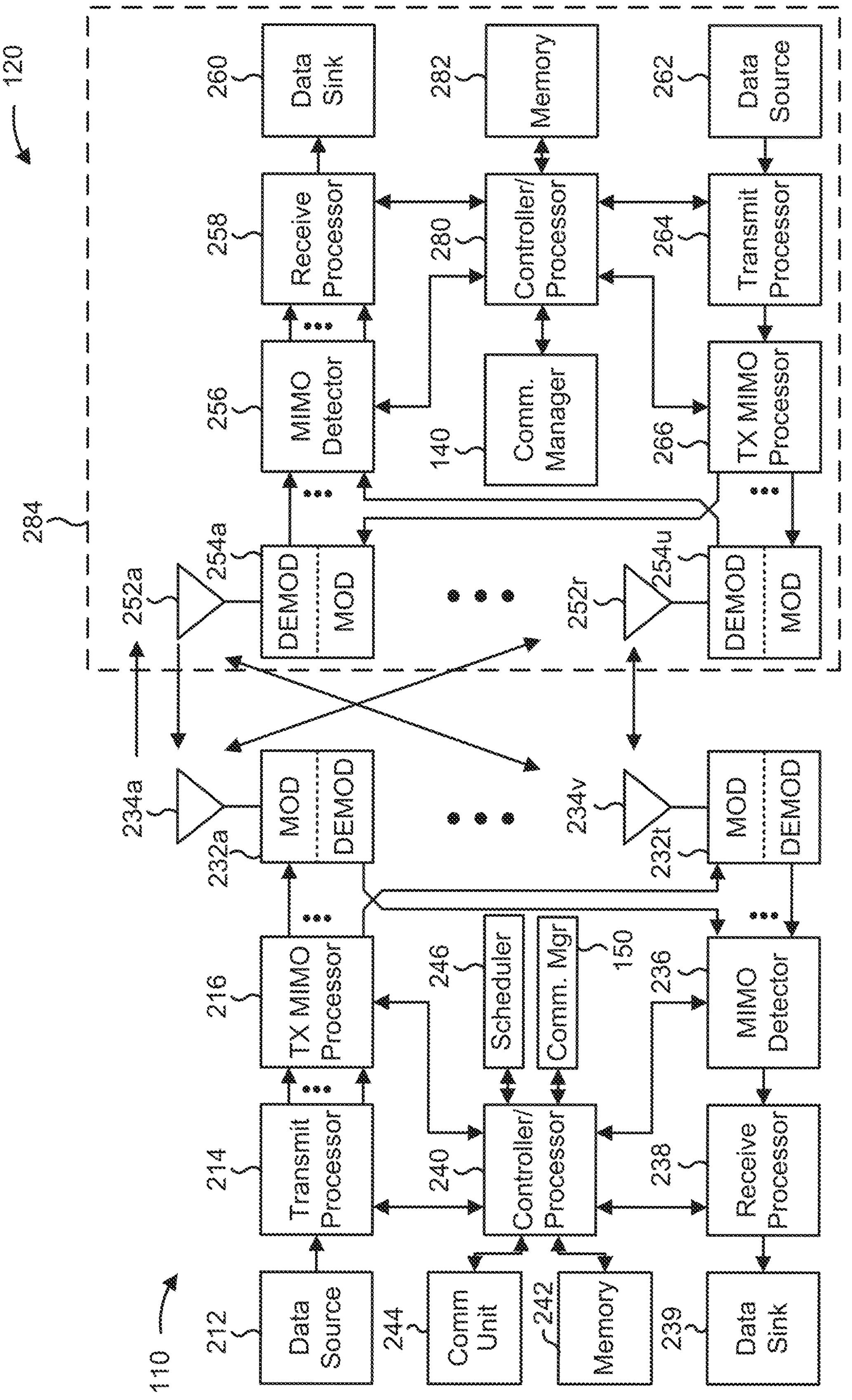
FIG. 2 is a diagram illustrating an example network node in communication with an example user equipment (UE) in a wireless network.

FIG. 2 is a diagram illustrating an example network node 110 in communication with an example UE 120 in a wireless network.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more modulation coding schemes (MCSs) for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
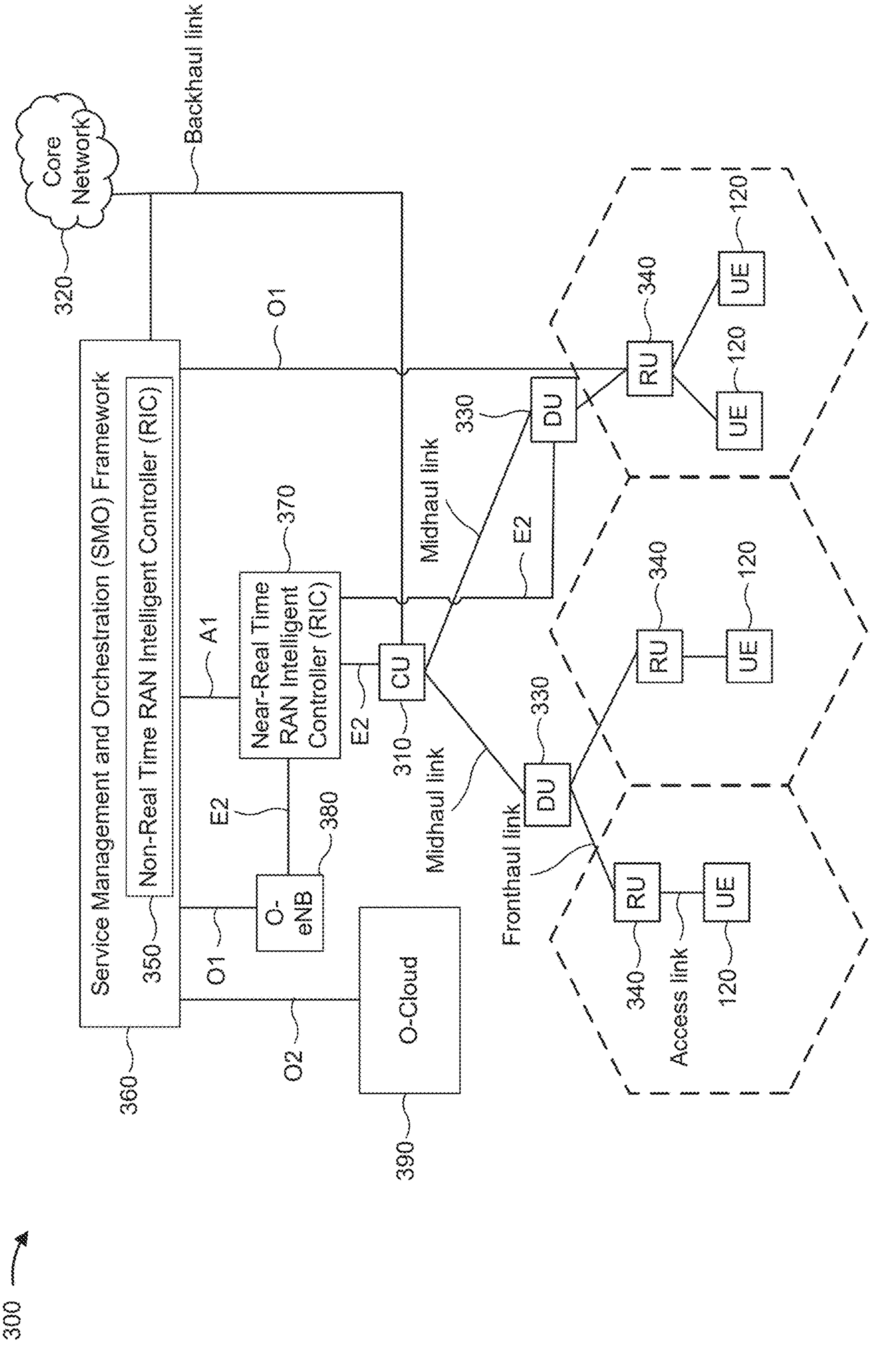
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with control signaling for closed-loop antenna selection and/or an antenna switching time delay indicate by a UE, as described in more detail elsewhere herein. For example, the controller/processor 240 of the network node 110, the controller/processor 280 of the UE 120, any other component(s) (or combinations of components) of FIG. 2, the CU 310, the DU 330, or the RU 340 may perform or direct operations of, for example, process 600 of FIG. 6, process 700 of FIG. 7, process 800 of FIG. 8, process 900 of FIG. 9, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 600 of FIG. 6, process 700 of FIG. 7, process 800 of FIG. 8, process 900 of FIG. 9, or other processes as described herein. In some examples, executing instructions may include running the instructions, converting the instructions, compiling the instructions, and/or interpreting the instructions, among other examples.

In some aspects, a network node (e.g., a network node 110) includes means for receiving one or more uplink reference signals that are associated with a plurality of antennas at a UE; and/or means for transmitting an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals.

Alternatively, or additionally, the network node includes means for receiving an indication of a UE capability that indicates an antenna switching time delay of a UE that is associated with switching to a network-node-based uplink antenna selection; and/or means for receiving an uplink transmission based at least in part on the antenna switching time delay. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

In some aspects, a UE (e.g., a UE 120) includes means for transmitting one or more uplink reference signals that are based at least in part on a plurality of antennas at the UE; means for receiving an indication of a network-node-based uplink antenna selection for the UE, the network-node-based uplink antenna selection being linked to specific precoding assigned to a future uplink transmission and being based at least in part on the one or more uplink reference signals; and/or means for receiving an uplink grant that is assigned to the UE for the future uplink transmission and indicates the specific precoding; and/or means for transmitting the future uplink transmission using the specific precoding, the network-node-based uplink antenna selection, and the uplink grant.

Alternatively, or additionally, the UE includes means for transmitting an indication of a UE capability that indicates an antenna switching time delay of the UE that is associated with switching to a network-node-based uplink antenna selection; and/or means for transmitting a future uplink transmission based at least in part on the antenna switching time delay and using the network-node-based uplink antenna selection. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
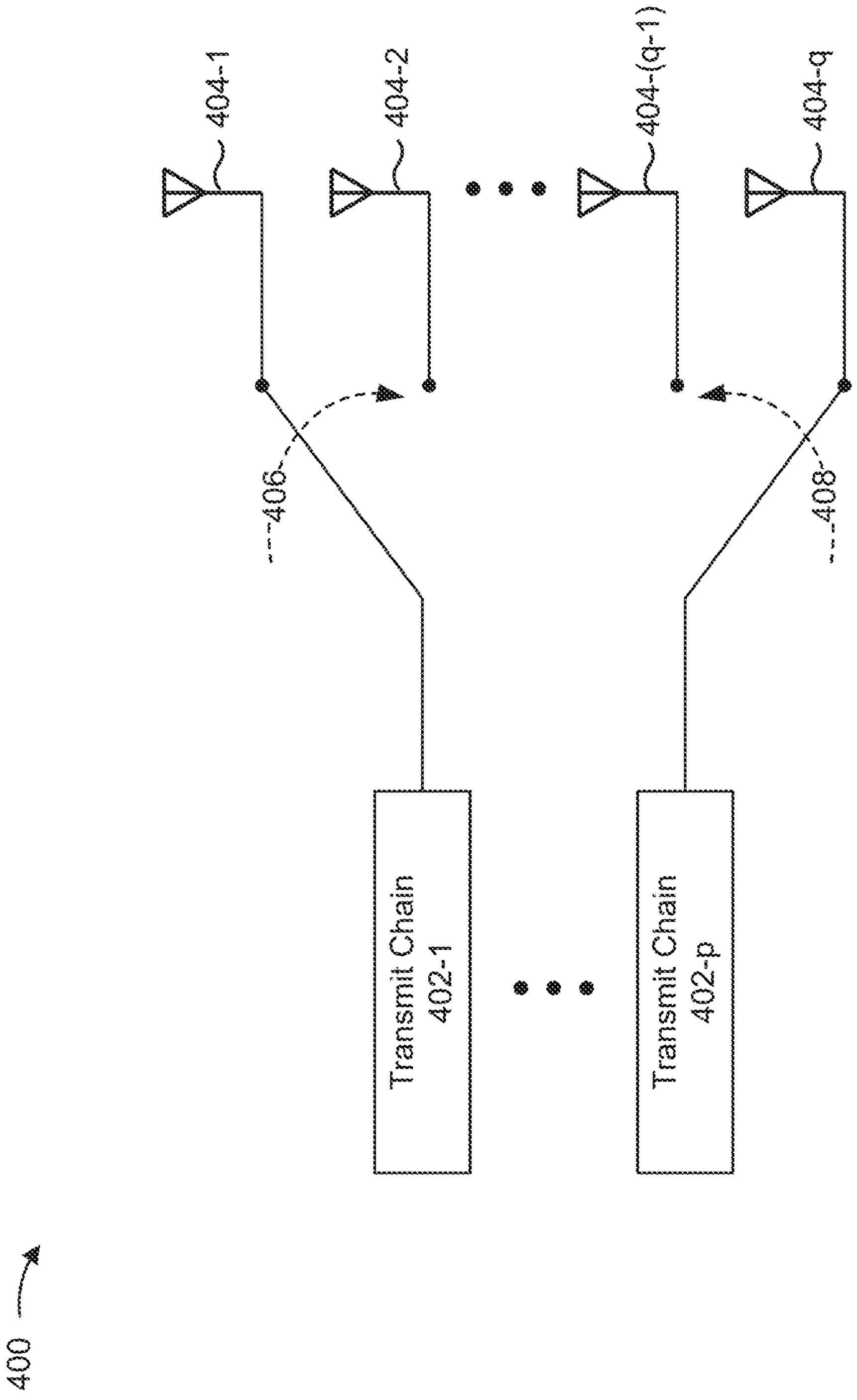
FIG. 4 is a diagram illustrating an example of antenna selection, in accordance with the present disclosure.

FIG. 4 is a diagram illustrating an example 400 of antenna selection, in accordance with the present disclosure.

A wireless communication device, such as a network node and/or a UE, may include fewer transmission chains than antennas. To illustrate, the example 400 includes p transmission chains (shown as transmission chain 402-1 up to transmission chain **402-*p*) and q antennas (shown as antenna 404-1, antenna 404-2, antenna 402-(*q*-1), up to antenna 402-*q***) that may be included in a same wireless communication device, where p is a first integer, q is a second integer, and p is smaller than q. For instance, a UE may include the p transmission chains as uplink transmission chains and/or sidelink transmission chains that may result in the UE supporting a maximum number of p baseband layers in a transmission. Some of the q antennas that are not connected to a transmission chain may be used as receive antennas and/or may be coupled to one or more receiver chains.

In some aspects, a wireless communication device may include a capability to switch connections between a transmission chain and an antenna. For instance, as shown by reference number 406, the wireless communication device may decouple the transmission chain 402-1 from the antenna 404-1 and couple the transmission chain 402-1 to the antenna 404-2. Alternatively, or additionally, as shown by reference number 408, the wireless communication device may decouple the transmission chain **402-*p* from the antenna 404-*q* and couple the transmission chain 402-*p* to the antenna 404-(*q*-1)**. The ability for a wireless communication device to switch and/or change connections between transmission chains and antennas may enable the wireless communication device to dynamically select and/or switch an antenna configuration (e.g., one or more antennas out of a set of antennas) that results in a higher signal quality relative to using a different antenna configuration. That is, the wireless communication device may switch antenna configurations to achieve a best antenna configuration (e.g., out of a set of antennas) that increases a signal quality. Examples of a higher signal quality may include a first signal with a higher signal power level, a lower interference level, and/or a higher signal-to-noise ratio (SNR) relative to a second signal. To determine a best antenna configuration out of a set of antennas, the wireless communication device may use and/or analyze a variety of factors, such as a per-antenna transmit power budget and/or one or more propagation channel characteristics of a channel between a transmitting wireless communication device and a receiving wireless communication device (e.g., a UE and a network node, respectively, for an uplink channel). Characteristics of a propagation channel may be computed and/or derived using one or more measurement metrics, such as a channel state information (CSI) metric, an SNR metric, a signal-to-interference-plus-noise ratio (SINR) metric, and/or an RSSI metric.

An uplink multiple-input-multiple-output (MIMO) channel that is based at least in part on p uplink transmission chains and M network node transmit-receive units (TXRUs) may be represented as follows:

$$H_{UL} = \begin{bmatrix} J_0 & \cdots & \\ \vdots & \ddots & \vdots \\ & \cdots & J_{N-1} \end{bmatrix} PL \cdot R^{NN\left(\frac{1}{2}\right)} H_w R^{UE\left(\frac{H}{2}\right)} \begin{bmatrix} I_0 & \cdots & \\ \vdots & \ddots & \vdots \\ & \cdots & I_{p-1} \end{bmatrix} \begin{bmatrix} \sqrt{P_0} & \cdots & \\ \vdots & \ddots & \vdots \\ & \cdots & \sqrt{P_{p-1}} \end{bmatrix} W$$

where $J_0$ to $J_{N-1}$ form a network node insertion loss matrix (e.g., J), PL is a channel propagation loss from a UE to a network node, $R^{NN(1/2)}$ is a network node receive antenna correlation matrix, $H_w$ is a uncorrelated fast fading channel component matrix, $R^{UE(H/2)}$ is a UE transmit antenna correlation matrix, $I_0$ to $I_{p-1}$ form a UE insertion loss matrix (e.g., I), $P_0$ to $P_{p-1}$ form an uplink transmit power matrix (e.g., P), and W is a precoding matrix.

In some aspects, the insertion loss matrices (e.g., I and J) and the antenna correlation matrices (e.g., $R^{UE}$ and $R^{NN}$) may not be reciprocals of one another, such as in a scenario in which calibration between the uplink and the downlink does not exist (e.g., uplink and downlink are uncalibrated with one another). The lack of reciprocity between the insertion loss matrices and the antenna correlation matrices may make the acquisition of individual values within the matrices difficult and, consequently, selection of a best antenna configuration difficult.

As one example, based at least in part on a network node being calibrated (e.g., calibration between uplink and downlink), the network node insertion loss matrix J and the network node receive antenna correlation matrix $R^{NN}$ may be reciprocal between an uplink channel and a downlink channel. Calibration between uplink and downlink at a UE, however, may be difficult to achieve, such that the UE insertion loss matrix I and the UE transmit antenna correlation matrix $R^{UE}$ may lack reciprocity between an uplink channel and a downlink channel. In such a scenario, an uplink measurement metric (e.g., measured by a network node) may provide more information relative to a downlink measurement metric (e.g., measured by a UE) that enables a wireless communication device to select an antenna configuration (e.g., one or more particular antennas out of a set of antennas) that provides a higher signal quality relative to other antenna configurations.

To illustrate, a UE may perform uplink antenna selection in an open-loop manner that is transparent to a network node. For example, the UE may compute one or more measurements based at least in part on receiving one or more downlink signals (e.g., downlink reference signals) using a set of antennas, such as by receiving downlink signal via a first antenna, generating a first measurement metric using the downlink signal, receiving the downlink signal via a second antenna, generating a second measurement metric using the downlink signal. The UE may compare the first and the second measurement metric to determine which antenna and/or antenna configuration is linked to a higher signal quality. Based at least in part on an assumption that at least some reciprocity exists between a downlink channel and an uplink channel, the UE may select an uplink antenna configuration using the antenna that produces a higher signal quality for a downlink signal.

However, and as described above, reciprocity between the uplink channel and the downlink channel may not exist, such as in a scenario that includes a mismatch between the uplink channel and the downlink channel due in part to insertion losses, antenna correlations, and/or wireless channel parameters. Based at least in part on the mismatch, the open-loop approach to selecting an antenna configuration by a UE may result in decreased signal quality (e.g., reduced signal power level and/or reduced SNR), such as in communication scenarios that use frequency division duplexing (FDD), a supplementary uplink (SUL), and/or an uplink reception point that is different from a downlink transmission point. Accordingly, the UE selecting an uplink antenna configuration using a downlink reciprocity assumption as described above may lead to decreased signal quality that results in increased recovery errors, increased data transfer delays, and/or decreased data throughput in a wireless network.

CLAS may include a network node selecting an uplink antenna configuration for a UE based at least in part on uplink signaling between a UE and a network node. For instance, the network node may select an uplink antenna configuration by reusing an uplink multiple-input multiple output (MIMO) architecture that is based at least in part on a CB uplink MIMO signaling and/or NCB uplink MIMO signaling. However, a network node reusing an uplink MIMO architecture that uses CB uplink MIMO signaling and/or NCB uplink MIMO signaling to perform CLAS may lack flexibility and/or support for various chain-antenna structures. To illustrate, uplink MIMO architecture in combination with CB uplink MIMO signaling for uplink antenna selection may only be used for antenna selection between a limited number of connections, each of which uses a separate reference signal resource (e.g., a sounding reference signal (SRS) resource) for the antenna selection, and the uplink MIMO architecture in combination with NCB uplink MIMO signaling may only allow the network node to perform an uplink antenna selection for a non-coherent antenna selection architecture and/or a fully connected antenna selection architecture since precoding selection capability (which does not have any selection constraint) is replaced by an antenna selection capability. Alternatively, or additionally, CLAS that uses the uplink MIMO architecture and uplink MIMO signaling may only be applicable to UEs that support fast dynamic antenna switching and/or may not be applicable to UEs that do not support fast dynamic antenna switching. Accordingly, a network node reusing an uplink MIMO architecture and uplink MIMO signaling for uplink antenna selection may not be supported by a wide variety of UEs, resulting in at least some UEs using a sub-optimal uplink antenna configuration, such as an uplink antenna configuration that is based at least in part on assuming reciprocity between an uplink channel and a downlink channel.

As another example of difficulties with CLAS, the individual components of the uplink transmit power matrix P (e.g., $P_0$ to $P_{p-1}$) and/or a maximum transmit power for each transmit antenna at a UE may be unknown to a network node. Alternatively, or additionally, each transmit antenna at the UE may be subject to a specific absorption rate (SAR) regulatory operating condition and/or maximum power reduction (MPR) regulatory operating conditions. Accordingly, a network node may lack sufficient information to select an antenna configuration at the UE that achieves a maximum transmit power for each transmit antenna, resulting in the network node selecting a sub-optimal antenna configuration. A sub-optimal antenna configuration may lead to decreased signal quality that results in increased recovery errors, increased data transfer delays, and/or decreased data throughput in a wireless network.

Various aspects relate generally to control signaling for closed-loop antenna selection. Some aspects more specifically relate to a network node selecting an uplink antenna configuration for a UE, and the uplink antenna configuration may be linked to specific precoding and/or a future uplink transmission that uses the specific precoding. In some aspects, a network node may receive one or more uplink reference signals that are associated with a plurality of antennas at a UE. To illustrate, the UE may transmit a first uplink reference signal (and/or a first portion of a reference signal) using a first antenna of the plurality of antennas) and a second uplink reference signal (and/or a second portion of the reference signal) using a second antenna of the plurality of antennas. Accordingly, the uplink reference signal(s) may be iteratively transmitted by the UE using a respective antenna of the plurality of antennas. Based at least in part on receiving the uplink reference signal(s), the network node may transmit an indication of a network-node-based uplink antenna selection for the UE. In some aspects, the network-node-based uplink antenna selection may be linked to (e.g., associated with) specific precoding (e.g., out of multiple different precodings) that is assigned to a future uplink transmission. For example, the network node may indicate to use the network-node-based uplink antenna selection for a future uplink transmission that is assigned the specific precoding. Accordingly, the linkage between the network-node-based uplink antenna selection and the specific precoding may be based at least in part on the network node selecting the network-node-based uplink antenna selection as an optimal (and/or jointly optimal) antenna configuration based at least in part on a transmission that uses the specific precoding. Alternatively, or additionally, the network-node-based uplink antenna selection may be based at least in part on the one or more uplink reference signals. To illustrate, the network node may generate a respective measurement metric using each reference signal transmitted by the UE, and each reference signal may be associated with a respective transmit antenna at the UE. The network node may use the measurement metric(s) to determine the network-node-based uplink antenna selection, such as by selecting an antenna that is associated with the highest measurement metric in a set of measurement metrics.

In some aspects, a UE may transmit one or more uplink reference signals that are based at least in part on a plurality of antennas at the UE, such as by transmitting each reference signal (and/or a respective portion of a reference signal) using a respective antenna in the plurality of antennas. Based at least in part on transmitting the one or more reference signals, the UE may receive an indication of a network-node-based uplink antenna selection for the UE. In some aspects, the network-node-based uplink antenna selection may be linked to specific precoding that is assigned to a future uplink transmission. Alternatively, or additionally, the network-node-based uplink antenna selection may be based at least in part on the one or more uplink reference signals as described herein. The UE may receive an uplink grant that is assigned to the UE for the future uplink transmission, and the uplink grant may indicate to use the specific precoding for the future uplink transmission. Accordingly, the UE may transmit the future uplink transmission using the specific precoding, the network-node-based uplink antenna selection, and the uplink grant.

Particular aspects of the subject matter described in this disclosure can be implemented to realize one or more of the following potential advantages. In some examples, by indicating a network-node-based uplink antenna selection that is linked to specific precoding, the described techniques can be used to mitigate signal degradation that is associated with a UE using downlink measurement metrics to select an uplink antenna configuration in a scenario that includes a lack of reciprocity between a downlink channel and an uplink channel. Instead, a network node may select the antenna configuration based at least in part on one or more reference signals that use an existing uplink channel between the network node and a UE. Mitigating such signal degradation may result in an antenna configuration that is associated with a higher signal quality (e.g., a higher signal power level and/or a lower interference power level), leading to reduced recovery errors, reduced data transfer delays, and/or increased data throughput in a wireless network.

Alternatively, or additionally, the use of a network-node-based uplink antenna selection that is linked to specific precoding may be supported by a larger variety of UEs relative to reuse of an uplink MIMO framework. The ability for a network node to select an uplink antenna configuration in a manner that is supported by a larger variety of UEs may mitigate signal degradation in a wireless network by reducing the number of UEs selecting a sub-optimal antenna configuration using a downlink measurement metric, resulting in reduced recovery errors, reduced data transfer delays, and/or increased data throughput in the wireless network.

A CLAS operation that is based at least in part on a network node selecting an uplink antenna configuration (e.g., a network-node-based uplink antenna selection) that is linked to (e.g., associated with) specific precoding may change uplink transmission timing at a UE. To illustrate, a PUSCH preparation time is a duration that is used by a UE to prepare a PUSCH transmission, where the PUSCH preparation time may be based at least in part on the UE receiving an uplink grant for the PUSCH transmission. For instance, the PUSCH preparation time may begin upon receipt of the uplink grant. In some aspects, a duration of the PUSCH preparation time may vary based at least in part on a transmission configuration, such as whether a BWP switch is occurring, whether an uplink carrier switch is occurring, and/or whether a first symbol of a PUSCH allocation is DMRS only or not. In some aspects, a network node may iteratively select and/or update a network-node-based uplink antenna selection (e.g., select a different uplink antenna configuration and/or a different combination of uplink antennas). Accordingly, using a network-node-based uplink antenna selection may result in the UE changing from a first uplink antenna configuration to a second uplink antenna configuration between uplink transmissions (e.g., between PUSCH transmissions). Without including a preparation time for changing antenna configurations (e.g., a re-tuning time that allows hardware to settle and/or a blanking time that mitigates interference), the UE may use a PUSCH preparation time that results in the UE transmitting an uplink signal that has degraded signal quality (e.g., due to unsettled hardware) and/or may generate interference in other communications (e.g., time division duplexing (TDD) communications and/or inter-band carrier aggregation communications). The degraded signal quality and/or increased interference may result in increased recovery errors, increased data transfer delays, and/or decreased data throughput in a wireless network.

In some aspects, a network node may receive an indication of a UE capability that specifies an antenna switching time delay of the UE. For example, the antenna switching time delay may be associated with the UE switching from using a first network-node-based uplink antenna selection (e.g., a first uplink antenna configuration) to using a second network-node-based uplink antenna connection (e.g., a second uplink antenna configuration). Alternatively, or additionally, the antenna switching time delay may be based at least in part on a re-tuning delay that allows hardware at the UE to settle to within a target percentage and/or a blanking delay that mitigates interference generated by the UE. In some aspects, the network node may receive a future uplink transmission at a future time (e.g., relative to the network node receiving the indication of the UE capability and/or after a switch in an uplink antenna configuration) that is based at least in part on the antenna switching time delay. To illustrate, the network node may identify that a network-node-based uplink antenna selection results in the UE changing an uplink antenna configuration. Accordingly, the network node may calculate an uplink transmission time for a future uplink transmission (e.g., that occurs after a switch in an uplink antenna configuration) that includes the antenna switching time delay (e.g., takes the antenna switching time delay into consideration). For instance, the network node may select an uplink grant for the future uplink transmission and/or may calculate a reception time for the future uplink transmission after expiration of the antenna switching time delay.

By indicating an antenna switching time delay, the UE may enable synchronized communications with the network node that mitigate signal degradation that is due to unsettled hardware. That is, the indication and/or use of the antenna switching time delay may ensure a smooth transition (e.g., hardware settling) between uplink antenna configurations and/or mitigate interference by the UE in other communications. Mitigating signal degradation and/or interference may result in decreased recovery errors, decreased data transfer delays, and/or increased data throughput in a wireless network.

As indicated above, FIG. 4 is provided as an example. Other examples may differ from what is described with regard to FIG. 4.

Figure 5:
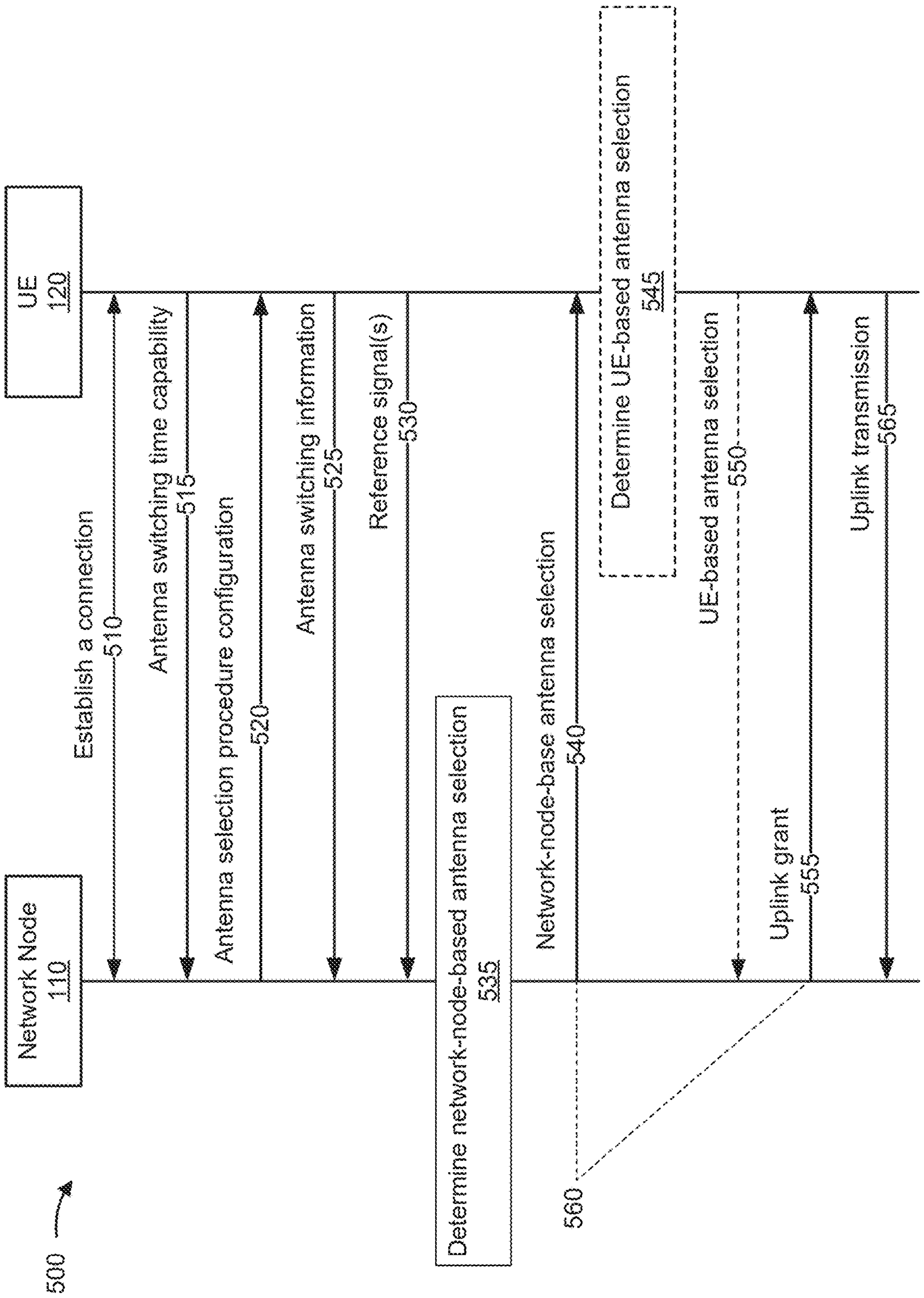
FIG. 5 is a diagram illustrating an example of a wireless communication process between a network node and a UE, in accordance with the present disclosure.

FIG. 5 is a diagram illustrating an example 500 of a wireless communication process between a network node (e.g., the network node 110) and a UE (e.g., the UE 120), in accordance with the present disclosure.

As shown by reference number 510, a network node 110 and a UE 120 may establish a connection. To illustrate, the UE 120 may power up in a cell coverage area provided by the network node 110, and the UE 120 and the network node 110 may perform one or more procedures (e.g., a random access channel (RACH) procedure and/or an RRC procedure) to establish a wireless connection. As another example, the UE 120 may move into the cell coverage area provided by the network node 110 and may perform a handover from a source network node (e.g., another network node 110) to the network node 110. Alternatively, or additionally, the network node 110 and the UE 120 may communicate via the connection based at least in part on any combination of Layer 1 signaling (e.g., DCI and/or uplink control information (UCI)), Layer 2 signaling (e.g., a MAC CE), and/or Layer 3 signaling (e.g., RRC signaling). To illustrate, the network node 110 may request, via RRC signaling, UE capability information and/or the UE 120 may transmit, via RRC signaling, the UE capability information. As part of communicating via the connection, the network node 110 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). To illustrate, the network node 110 may transmit the configuration information via Layer 3 signaling at a first point in time associated with the UE being tolerant of communication delays, and the network node 110 may transmit an activation of the configuration via Layer 2 signaling and/or Layer 1 signaling at a second point in time associated with the UE being intolerant of communication delays.

As shown by reference number 515, the UE 120 may transmit, and the network node 110 may receive, an indication of an antenna switching time capability. Alternatively, or additionally, the UE 120 may indicate support for an antenna selection procedure performed with a network node (e.g., to select a network-node-based uplink antenna selection). In some aspects, the UE 120 may indicate support for coherent precoding. For clarity, FIG. 5 illustrates the UE 120 transmitting the indication of the antenna switching time capability (and/or the indication of support for an antenna selection procedure performed by a network node and/or the support for coherent precoding) in a separate transaction than establishing a connection with the network node 110. However, the UE 120 may transmit the indication of the antenna switching time capability as part of establishing a connection with the network node 110 in other examples.

In some aspects, the antenna switching time capability may indicate an antenna switching time delay of the UE 120 that is associated with switching an antenna configuration. For example, the antenna switching time delay may be based at least in part on hardware settling at the UE 120, such as hardware settling to within a target percentage when switching from using a first antenna configuration to using a second antenna configuration (e.g., switching from using a first network-node-based uplink antenna selection to using a second network-node-based uplink antenna selection for an uplink transmission). Accordingly, the antenna switching time delay may be associated with the UE 120 using a network-node-based uplink antenna selection and/or a UE-based antenna selection as described below. The antenna switching time delay may be denoted as $D_{AS}$.

As shown by reference number 520, the network node 110 may transmit, and the UE 120 may receive, an antenna selection procedure configuration. In some aspects, the antenna selection procedure configuration indicates one or more air interface resources (e.g., a frequency resource, a time resource, a coding resource, and/or a spatial resource) that may be used by the network node 110 and/or the UE 120 as at least part of the antenna selection procedure. To illustrate, the UE 120 may transmit, and the network node 110 may receive, one or more reference signals using the air interface resources. As another example, the antenna selection procedure configuration may indicate an uplink antenna transmission order for transmitting reference signals, such as by indicating a first antenna to use for transmitting a first reference signal, a second antenna to use for transmitting a second reference signal, and/or a third antenna to use for transmitting a third reference signal.

As shown by reference number 525, the UE 120 may transmit, and the network node 110 may receive, antenna switching information. As one example of antenna switching information, the UE 120 may transmit respective transmission power information for each antenna at the UE 120. In some aspects, the network node 110 may use the antenna switching information to determine a network-node-based uplink antenna selection and/or an uplink antenna configuration for the UE 120.

As shown by reference number 530, the UE 120 may transmit, and the network node 110 may receive, one or more reference signals. As one example, the UE 120 may transmit one or more SRSs using air interface resource(s) indicated by the network node 110 in the antenna selection procedure configuration. In some aspects, the UE 120 may iterate through transmitting the reference signal(s) by transmitting a first reference signal (or a first portion of a reference signal) using a first antenna and a second reference signal (or a second portion of the reference signal) using a second antenna. Accordingly, the UE 120 may transmit the reference signal(s) using a plurality of antennas. In some aspects, the reference signal(s) may be referred to as antenna selection reference signals that are transmitted as part of an antenna selection procedure, such as an antenna selection procedure performed by the network node 110 as described below with regard to reference number 535.

As shown by reference number 535, the network node 110 may determine a network-node-based uplink antenna selection, such as an uplink antenna configuration of one or more antennas for the UE 120 to use for a future uplink transmission. That is, the network node 110 may perform an antenna selection procedure that determines the uplink antenna configuration for the UE 120. In some aspects, the network-node-based uplink antenna selection may be linked to a specific precoding (e.g., from multiple different precodings). For example, the network node 110 may select an optimal antenna configuration for the network-node-based uplink antenna selection using the specific precoding. An optimal antenna configuration may be a selection of one or more antennas that, in combination, produce a higher signal quality (e.g., a higher signal power level and/or a reduced interference level) for a transmission relative to other antenna configurations using a same configuration (e.g., precoding, a carrier frequency, and/or bandwidth). Accordingly, the network node 110 may determine and/or optimize the network-node-based uplink antenna selection for the specific precoding. In some aspects, the network node 110 may determine the network-node-based uplink antenna selection by computing a joint optimization between one or more potential antenna selections (e.g., one or more transmit antennas out of multiple transmit antennas at the UE) and the specific precoding (e.g., a precoding matrix) as described below. "Joint optimization" may denote computing a solution that optimizes a system using multiple parameters, rather that optimizing the system using a single parameter, to achieve a balance between tradeoffs associated with the multiple parameters. To illustrate, a solution that is based at least in part on a joint optimization may not use a maximum power level for a power level metric. Rather, the solution may use a lesser power level for the power level metric that is analyzed in combination with an antenna correlation value as described below.

In some aspects, the network node 110 may select the network-node-based uplink antenna selection using the reference signal(s) transmitted by the UE 120 (e.g., the antenna selection reference signals). To illustrate, the network node 110 may generate a respective measurement metric (e.g., RSRP and/or RSSI) for each reference signal transmitted by the UE 120 (e.g., as part of the antenna selection procedure), and each measurement metric may be linked to a respective antenna that is used by the UE 120 to transmit the respective reference signal. Alternatively, or additionally, each measurement metric may be linked to a precoding which is supposed to be used by the UE 120 to transmit the respective uplink signal. The network node 110 may analyze the measurement metrics, identify a measurement metric out of the set of measurement metrics that indicates the highest signal quality, and include the respective antenna linked to the measurement metric in the network-node-based uplink antenna selection.

The network node 110 may compute the network-node-based uplink antenna selection based at least in part on non-coherent (NC) codebook usage. That is, the network node 110 may use an antenna selection algorithm that is configured to optimize an antenna selection for NC codebook usage. As a first example, a spectral efficiency equation for NC codebook usage for a rank 1 transmission via a 2-transmitter chain UE may be computed as a channel capacity using the following equation:

$$C_{r1} = \log\left[\det\left(I + SNR[1\ 0]\begin{bmatrix} h_0^H h_0 & h_0^H h_1 \\ h_1^H h_0 & h_1^H h_1 \end{bmatrix}\begin{bmatrix} 1 \\ 0 \end{bmatrix}\right)\right],$$

where $C_{r1}$ is the channel capacity for the rank 1 transmission via the 2-transmitter chain UE, I is the identity matrix, SNR is the average signal-to-noise ratio for a given uplink transmission, and $h_n$ (n being an integer that ranges from 0 to 1) is a channel vector. The above equation is equal to the following simplified equation:

$$C_{r1} = \log(1 + SNR \cdot \|h_0\|^2).$$

As shown by the simplified equation, an optimal antenna selection for NC codebook usage for the rank 1 transmission via the 2-transmitter chain UE may be based at least in part on an antenna that is associated with the largest signal strength ($\|h_0\|^2$). In the above simplified equation, SNR is relatively constant across different antenna configurations, while the channel vector may vary between the different antenna configurations. In some aspects, $SNR \cdot \|h_0\|^2$ may be calculated and/or derived using a measurement metric (e.g., RSRP). Accordingly, the optimal antenna configuration may be selected by the network node 110 for NC codebook usage for a rank 1 transmission via a 2-transmitter chain UE (e.g., where a rank is smaller than a number of transmitter chains at the UE) using an antenna selection algorithm that analyzes a plurality of measurement metrics (e.g., generated using the reference signals transmitted by the UE 120), selects the measurement metric with the highest value (e.g., highest RSRP), and includes the antenna configuration linked to (e.g., associated with) the measurement metric (e.g., the antenna configuration used by the UE 120 to transmit the respective reference signal) in the network-node-based uplink antenna selection. Accordingly, to select and/or derive the network-node-based uplink antenna selection for a rank 1, 2-transmitter chain at a UE for NC codebook usage, the network node 110 may select an antenna by optimizing a signal strength metric and/or selecting the antenna that is linked to (e.g., associated with) a highest signal metric.

As a second example, a spectral efficiency equation for NC codebook usage for a rank 2 transmission via a 2-transmitter chain UE may be computed as channel capacity using the following equation:

$$C_{r2} = \log\left[\det\left(I + \frac{SNR}{2}\begin{bmatrix} h_0^H h_0 & h_0^H h_1 \\ h_1^H h_0 & h_1^H h_1 \end{bmatrix}\begin{bmatrix} 1 & 0 \\ 0 & 1 \end{bmatrix}\right)\right]$$

where $C_{r2}$ is the channel capacity for the rank 2 transmission via the 2-transmitter chain UE, I is the identity matrix as described above, SNR is the average signal-to-noise ratio for a given uplink transmission, and $h_n$ (n being an integer that ranges from 0 to 1) is a channel vector. The above equation may be further represented as:

$$C_{r2} = \log\left(1 + \frac{SNR}{2}\|h_0\|^2 + \frac{SNR}{2}\|h_1\|^2 + (1-|\rho|^2)\left(\frac{SNR}{2}\right)^2\|h_0\|^2\|h_1\|^2\right)$$

where ρ is an antenna correlation between two given antennas for antenna selection. As shown by the above equation, an optimal antenna selection for a rank 2 transmission using a 2-transmitter chain UE may be based at least in part on a balance of high signal strengths $\|h_0\|$ and $\|h_1\|$ (e.g., an RSRP metric that satisfies a high power threshold) and a low antenna correlation (e.g., a low ρ value that satisfies a low correlation threshold to minimize $(1-|\rho|^2)$). Accordingly, the network node 110 may select the network-node-based uplink antenna selection for a rank 2 transmission via a 2-transmitter chain UE with NC codebook usage using an antenna selection algorithm that optimizes a balance between a high signal strength metric (e.g., that satisfies a high power threshold) and a low antenna correlation (e.g., that satisfies a low correlation threshold). That is, for a rank 2 transmission using a 2-transmitter chain UE with NC codebook usage, the network node 110 may analyze both a signal strength metric and an antenna correlation (e.g., the network node 110 may perform a joint optimization using the signal strength metric and the antenna correlation), and include the antenna that has the optimal balance between a signal strength metric and antenna correlation in the network-node-based uplink antenna selection.

A third example may include a coherent codebook usage scenario for a rank 1 transmission using a 2-transmitter chain UE. In a similar manner as the first example and the second example, a spectral efficiency may be computed as a channel capacity, which, for the third example, may be calculated using the following equation:

$$C_{r1} = \log\left[\det\left(I + SNR[\,w_0^* \;\; w_1^*\,]\begin{bmatrix} h_0^H h_0 & h_0^H h_1 \\ h_1^H h_0 & h_1^H h_1 \end{bmatrix}\begin{bmatrix} w_0 \\ w_1 \end{bmatrix}\right)\right],$$

where $C_{r1}$ is the channel capacity for the rank 1 transmission via the 2-transmitter chain UE, I is the identity matrix as described above, $h_n$ (n being an integer that ranges from 0 to 1) is a channel vector, and $w_n$ is a weighting selected from the CB codebook. The channel capacity equation for the rank 1 transmission via the 2-transmitter chains UE using a coherent codebook may be simplified to:

$$C_{r1} = \log\left(1 + SNR\cdot\left(\|w_0 h_0\|^2 + 2Re\{w_0 w_1 \rho\} + \|w_1 h_1\|^2\right)\right)$$

In the simplified equation, $h_0$, $h_1$ and antenna correlation (e.g., ρ) may vary between different antenna configurations. Thus, an optimal antenna selection may be based on a joint optimization between a high signal strength (e.g., a high RSRP) and a high antenna correlation. Accordingly, the network node 110 may determine and/or derive the network-node-based uplink antenna selection for a rank 1 transmission using a 2-transmitter chain UE with coherent codebook usage based at least in part on an antenna selection algorithm that performs a joint optimization that balances a signal strength metric (e.g., that satisfies a high power threshold) with an antenna correlation that satisfies a high correlation threshold. To illustrate, and in a similar manner as described with regard to the first example and the second example, the network node 110 may select, for a rank 1 transmission using a 2-transmitter chain UE with coherent codebook usage, an uplink antenna configuration that is linked to (e.g., associated with) the jointly optimized signal strength metric and the antenna correlation (e.g., the uplink antenna configuration used by the UE 120 to transmit the respective reference signal used to generate the measurement metrics). Although the third example is similar to the first example insofar as the transmission rank is smaller than a number of transmitter chains at the UE, the differing codebook types (e.g., a coherent codebook versus an NC codebook type) for each example uses a different antenna selection algorithm to select an optimal antenna configuration.

A fourth example may include a coherent codebook usage scenario for a rank 2 transmission using a 2-transmitter chain UE. In a similar manner as the first example, the second example, and the third example, a spectral efficiency may be computed as a channel capacity, which, for the fourth example, may be represented using the following equation:

$$C_{r2} = \log\left[\det\left(I + SNR\cdot(HP)^H(HP)\right)\right]$$

where $C_{r2}$ is the channel capacity for the rank 2 transmission via the 2-transmitter chain UE, I is the identity matrix as described above, H is a channel matrix, and P is the uplink transmit precoding matrix as described above. The channel capacity equation may be further simplified as:

$$= \log\left[\det\left(I + SNR\cdot(HP)(HP)^H\right)\right]$$
$$= \log\left[\det\left(I + SNR\cdot H^H H\right)\right]$$
$$= \log\left(1 + \frac{SNR}{2}\|h_0\|^2 + \frac{SNR}{2}\|h_1\|^2 + (1-|\rho|^2)\left(\frac{SNR}{2}\right)^2\|h_0\|^2\|h_1\|^2\right)$$

based at least in part on assuming unitary precoding. In a similar manner as described above, p is an antenna correlation and $h_n$ (n being an integer that ranges from 0 to 1) is a channel vector. In the fourth example, an optimal antenna selection may be based at least in part on a joint optimization between a high signal strength (e.g., a high RSRP) and a low antenna correlation. Accordingly, for a rank 2 transmission via the 2-transmitter chain UE with coherent codebook usage, the network node 110 may determine and/or derive the network-node-based uplink antenna selection based at least in part on a joint optimization that balances a signal strength metric (e.g., that satisfies a high power threshold) and an antenna correlation (e.g., that satisfies a low correlation threshold), and including an antenna that is linked to (e.g., associated with) the balanced signal strength metric and antenna correlation in the network-node-based uplink antenna selection.

The first and second examples above relate to NC codebook scenarios for different transmission ranks and a same number of transmission chains, and the third and fourth examples above relate to coherent codebook usage for different transmissions ranks and a same number of transmission chains. As described above, the different ranks and codebook usage configurations (e.g., an NC codebook or a coherent codebook) may result in different antenna selection algorithms and results for optimizing an uplink antenna configuration. While the above examples alternate between using different ranks using a same number of transmission chains, other examples may include variations in a number of transmission chains at the UE. Alternatively, or additionally, other examples may include variations in different coherent codebook types and/or different NC codebook types. Accordingly, the network node 110 may compute and/or derive multiple network-node-based uplink antenna selections, and each network-node-based uplink antenna selection may be optimized for a respective transmission configuration, such as a different rank configurations (e.g., per-rank network-node-based uplink antenna selections), different transmission chain configurations (e.g., per-number-of-UE-transmission-chains network-node-based uplink antenna selections), and/or different codebook types (e.g., a per-codebook-type network-node-based uplink antenna selection). That is, the network node 110 may optimize and indicate an uplink antenna selection result for a particular transmission configuration, rather than using a same antenna selection algorithm for each transmission configuration, to increase a signal quality in an uplink transmission. To illustrate, based at least in part on the UE 120 indicating support for coherent codebooks, the network node 110 may compute and indicate a first network-node-based uplink antenna selection for an NC codebook usage configuration, and a second network-node-based uplink antenna selection for a coherent codebook usage configuration.

In some aspects, the network node 110 may select a precoding matrix for the future uplink transmission using one or more non-antenna-selection reference signals that are not transmitted as part of the antenna selection procedure (e.g., one or more different reference signals than described with regard to reference number 530). For example, the network node 110 may receive, as a non-antenna selection reference signal, an SRS that is configured with codebook usage as part of precoding and MCS adaptation. In some aspects, the precoding matrix selected by the network node 110 using the non-antenna selection reference signal(s) may differ from the specific precoding used to select the network-node-based uplink antenna selection. For instance, channel conditions may change and/or a UE location may change between selection of the network-node-based uplink antenna selection using the antenna selection reference signal(s) and receipt of the non-antenna selection reference signal(s). Accordingly, the network node 110 may perform precoding matrix selection separately from an antenna selection procedure and/or may select a different precoding for a future uplink transmission than the specific precoding used for the antenna selection procedure.

As shown by reference number 540, the network node 110 may transmit, and the UE 120 may receive, an indication of the network-node-based uplink antenna selection. In some aspects, the network node 110 may transmit the indication of the network-node-based uplink antenna selection in DCI, such as uplink grant DCI. Alternatively, or additionally, the uplink grant DCI may indicate an uplink grant that is assigned to the UE 120 for a future uplink transmission. In other aspects, the network node 110 may transmit the indication of the network-node-based uplink antenna selection in a MAC CE and/or in RRC signaling that is a separate transmission from an uplink grant transmission as described below with regard to reference number 555. In some aspects, the separate transmission that indicates the uplink grant may indicate a precoding matrix that differs from the specific precoding that is linked to (e.g., associated with) the network-node-based uplink antenna selection (e.g., the specific precoding used to select the network-node-based uplink antenna selection and/or the specific precoding of a future transmission as described above).

As described herein, the network-node-based uplink antenna selection may be linked to a specific precoding and/or may be an antenna configuration that the network node 110 optimized for the specific precoding. In some aspects, the network node 110 may indicate the specific precoding in uplink DCI that indicates the network-node-based uplink antenna selection. To illustrate, the network node 110 may indicate, in addition to the network-node-based uplink antenna selection and as the specific precoding, a transmit precoding matrix indicator (TPMI) that indicates a precoding matrix (e.g., a rank indicator (RI) and/or a precoding matrix indicator (PMI)) to use for the future uplink transmission. Accordingly, the uplink DCI may jointly indicate a network-node-based uplink antenna selection, an uplink grant that is assigned to the UE 120 for a future uplink transmission (e.g., a future PUSCH transmission), and a TPMI to use for the future uplink transmission. In some aspects, the network node 110 may indicate a non-coherent precoding matrix in an uplink grant transmission, even in a scenario in which the UE 120 indicates support for coherent precoding, such as in an antenna blocking case where some of the antennas are not useful for uplink transmission.

As described with regard to reference number 535, the network node 110 may select different network-node-based uplink antenna selections for different transmission configurations. As one non-limiting example, based at least in part on the UE 120 indicating support for coherent precoding, the network node 110 may determine to select multiple different network-node-based uplink antenna selections, such as a respective antenna selection and/or antenna configuration for a respective coherent precoding (e.g., a respective per-codebook-type network-node-based uplink antenna selection for each codebook type). Accordingly, the network node 110 may indicate, as the network-node-based uplink antenna selection, a plurality of antenna selections, such as by indicating a respective network-node-based uplink antenna selection for a respective combination of a transmission rank, a codebook usage configuration (e.g., an NC codebook usage configuration or a coherent codebook usage configuration), and/or a number of transmission chains. In some aspects, the network node 110 may indicate the plurality of antenna selections and/or the multiple network-node-based uplink antenna selections in a MAC CE and/or in RRC signaling. Alternatively, or additionally, the network node may indicate a single network-node-based uplink antenna selection in DCI.

The network node 110 may explicitly or implicitly indicate the link between a respective network-node-based uplink antenna selection and the respective transmission configuration (e.g., rank and/or codebook usage configuration). An example of an explicit indication may include a field and/or bit that is explicitly dedicated to specifying any combination of a transmission rank, a codebook usage configuration, and/or a number of transmitter chains. An example of an implicit indication may include an order in which the different network-node-based uplink antenna selections are listed, and each position in the order maps to a respective transmission configuration (e.g., transmission rank, codebook usage configuration, and/or number of transmission chains). According, as at least part of indicating a network-node-based uplink antenna selection, the network node 110 may indicate a respective rank and/or a respective codebook type (which may include different types of NC codebooks and/or different types of coherent codebooks) for each antenna selection of a plurality of antenna selections selected and/or indicated by the network node 110. As one example, the network node 110 may indicate a respective network-node-based uplink antenna selection for each of the four examples described above for rank 1 transmissions and rank 2 transmissions using a 2-transmitter chain UE, an NC codebook, and/or a coherent codebook.

In some aspects, the network node 110 may indicate an antenna switching state (e.g., enabled or disabled) in the DCI to specify whether the network-node-based uplink antenna selection is a change from a prior antenna configuration. To illustrate, an enabled antenna switching state may indicate that the network-node-based uplink antenna selection is different from a prior antenna configuration and/or a prior network-node-based uplink antenna selection such that the enabled antenna switching state indicates a switch in an antenna configuration. A disabled antenna switching state may indicate that the network-node-based uplink antenna selection is a same antenna configuration as a prior antenna configuration and/or a prior network-node-based uplink antenna selection. Accordingly, a disabled antenna switching state may indicate that there is no switch in an antenna configuration.

The DCI may include one or more explicit bits that are used by the network node to indicate an antenna switching state. Each bit may map to a respective network-node-based antenna selection, and/or multiple bits may map to a single network-node-based antenna selection. In one example, the network node 110 may set one or more of the explicit bits to a first value (e.g., "0") to indicate a disabled antenna switching state and a second value (e.g., "1") to indicate an enabled antenna switching state. A disabled antenna switching state may indicate to use, as an antenna switching time, a value of 0 to compute a preparation time (e.g., a PUSCH preparation time), and an enabled antenna switching state may indicate to use a value indicated in a UE capability as described with regard to reference number 515 to compute the preparation time. Examples of computing a preparation time are described below with regard to reference number 565. Accordingly, the antenna switching state may indicate an antenna switching delay value to use in computing a preparation time.

Alternatively, or additionally, the UE 120 may derive and/or compute the antenna switching state based at least in part on comparing the network-node-based uplink antenna selection indicated by the network node in a current transmission and a current antenna configuration at the UE 120. That is, the UE 120 may derive and/or compute the antenna switching state without receiving an explicit indication from the network node 110. In some aspects, the derived antenna switching state may indicate a value to use for computing a preparation time. To illustrate, the UE 120 may use a value of 0 to compute a PUSCH preparation time based at least in part on deriving a disabled antenna switching state, and may use a value indicated in a UE capability to compute the PUSCH preparation time based at least in part on deriving an enabled antenna switching state.

The network node 110 may be configured (e.g., in hardware, firmware, and/or software) to anticipate a delay in a subsequent uplink transmission from the UE 120 for scenarios associated with an enabled antenna switching state, such as a delay that is based at least in part on the antenna switching time (e.g., $D_{AS}$). As one example, the network node may be programmed to not expect any subsequent uplink transmission from the UE 120 during the antenna switching time. To illustrate, based at least in part on indicating an enabled antenna switching state to the UE 120 on slot n, the network node 110 may be configured to not expect an uplink transmission (e.g., a PUCCH transmission and/or a PUSCH transmission) until at least slot $n+[D_{AS}/D_{slot}]$, where $D_{slot}$ is a slot duration.

As shown by reference number 545, the UE 120 may determine a UE-based antenna selection. To illustrate, the network-node-based uplink antenna selection as described with regard to reference number 540 may be a proposed uplink antenna selection that the UE 120 may or may not determine to use for a future uplink transmission. Alternatively, or additionally, the network-node-based uplink antenna selection may be one of multiple proposed uplink antenna selections, and the UE 120 may perform an analysis of one or more proposed uplink antenna selections to validate an antenna selection by the network node 110 and/or to select one of the multiple proposed antenna selections. In some aspects, the UE 120 may analyze one or more proposed antenna selections to determine an antenna selection that provides an optimal performance. For instance, the UE 120 may select a proposed uplink antenna selection based at least in part on an implementation feasibility (e.g., unfeasible when an antenna blocked or feasible when an antenna is unblocked) and/or transmit power availability associated with the proposed uplink antenna selection. As one example, the network node 110 may indicate a first proposed uplink antenna selection and a second proposed uplink antenna selection by selecting the antennas associated with the first highest signal power metric and the second highest signal power metric, respectively, and the UE 120 may determine to use the second proposed uplink antenna selection based at least in part on determining that the first proposed uplink antenna selection is not feasible (e.g., is blocked).

While the example 500 includes the UE 120 determining a UE-based antenna selection, other examples may not include the UE 120 determining a UE-based antenna selection, further shown in FIG. 5 through the use of a dotted line. To illustrate, in other examples, the UE 120 may use the network-node-based uplink antenna selection as an instruction (e.g., not a proposal) and/or without performing a validation of the network-node-based uplink antenna selection.

As shown by reference number 550, the UE 120 may transmit, and the network node 110 may receive, an indication of the UE-based antenna selection. As one example, the UE 120 may transmit an indication that confirms a proposed antenna selection from the network node 110 and/or selects one of multiple proposed antenna selections from the network node 110.

While the example 500 includes the UE 120 transmitting an indication of a UE-based antenna selection, other examples may not include the UE 120 transmitting the indication of the UE-based antenna selection, further shown in FIG. 5 through the use of a dotted line. To illustrate, in other examples, the UE 120 may use the network-node-based uplink antenna selection without validating the network-node-based uplink antenna selection and/or without performing a UE-based antenna selection process. Accordingly, the UE 120 may not transmit an indication of a UE-based antenna selection.

As shown by reference number 555, the network node 110 may transmit, and the UE 120 may receive, an indication of an uplink grant for a future uplink transmission, and the uplink grant may be assigned to the UE 120. For clarity, FIG. 5 illustrates the network node 110 transmitting the indication of the uplink grant in a separate transmission than the indication of the network-node-based uplink antenna selection in the example 500, but other examples may include the network node 110 transmitting the indication of the uplink grant in a same transmission as the indication of the network-node-based uplink antenna selection (e.g., in uplink grant DCI) as shown by reference number 560.

In some aspects, the network node 110 may transmit the uplink grant with a configuration that is based at least in part on an antenna switching time delay that is indicated by the UE 120. For example, the network node 110 may select one or more time resources that occur after expiration of the antenna switching time delay and/or after expiration of a preparation time (e.g., a PUSCH preparation time) that is based at least in part on the antenna switching time delay. Examples of computing a preparation time using the antenna switching time delay are described below with regard to reference number 565. In some aspects, the network node 110 may select the configuration of the uplink grant based at least in part on an antenna switching state that is relative to the UE using the network-node-based uplink antenna selection (e.g., an enabled antenna switching state and/or a disabled antenna switching state as described above). For instance, based at least in part on an enabled antenna switching state, the network node 110 may select time resource(s) that occur after expiration of the preparation time. Alternatively, or additionally, the uplink grant may indicate to use the specific precoding (e.g., that is linked to a network-node-based uplink antenna selection) for the future uplink transmission. For instance, the uplink grant may indicate a TPMI. In some aspects, the uplink grant may indicate a precoding that is different from the specific precoding that is linked to the network-node-based uplink antenna selection. That is, the precoding indicated with the uplink grant may be mismatched with the specific precoding linked to the network-node-based uplink antenna selection. Accordingly, in some aspects, the network node 110 may indicate multiple network-node-based uplink antenna selection (e.g., via a MAC CE and/or RRC signaling), and each network-node-based uplink antenna selection may be linked to (e.g., associated with) respective precoding to mitigate a mismatch with precoding indicated in an uplink grant. That is, the UE 120 may determine which network-node-based uplink antenna selection to use by selecting the network-node-based antenna selection that is linked to the precoding indicated in the uplink grant.

As shown by reference number 565, the UE 120 may transmit, and the network node 110 may receive, an uplink transmission, and the uplink transmission may be the future uplink transmission linked to the network-node-based uplink antenna selection. Accordingly, the UE 120 may transmit the uplink transmission using the network-node-based uplink antenna selection (e.g., an uplink antenna configuration selected by the network node 110), while in other aspects, the UE 120 may transmit the uplink transmission using a UE-based antenna selection.

The UE 120 may analyze the uplink grant and determine that the uplink grant indicates to use the specific precoding linked to the network-node-based uplink antenna selection. In some aspects, and based at least in part on the analysis, the UE 120 may use the network-node-based uplink antenna selection, the specific precoding, and the uplink grant to generate and transmit the uplink transmission. In other aspects, and based at least in part on the analysis, the UE 120 may use the UE-based antenna selection, the specific precoding, and the uplink grant to generate and transmit the uplink transmission.

In some aspects, the UE 120 may generate and/or transmit the uplink transmission based at least in part on the antenna switching time delay. To illustrate, based at least in part on an enabled antenna switching state, the UE 120 may calculate a preparation time (e.g., a PUSCH preparation time) that is used by the UE 120 to delay the uplink transmission using a non-zero value for the antenna switching time delay. Alternatively, or additionally, based at least in part on an enabled antenna switching state, the network node 110 may calculate the preparation time using a non-zero value for the antenna switching time delay to determine a reception time for the uplink transmission. Based at least in part on a disabled antenna switching state, the UE 120 (and/or the network node 110) may calculate the preparation time using a value of zero as the antenna switching time delay. That is, the antenna switching time delay may be non-zero based at least in part on the UE 120 switching to a different antenna configuration (e.g., an antenna configuration indicated by the network node 110 and/or selected by the UE 120). As a first example, a preparation time may be computed as follows:

$$T_{proc,2} = \max((N_2 + d_{2,1} + d_2)(2048 + 144) \cdot \kappa 2^{-\mu} \cdot T_c + T_{ext} + T_{swtich}, d_{2,2}, d_{AS})$$

where $T_{proc,2}$ is the preparation time in units of seconds, $d_{AS}$ is an explicit antenna switching time (e.g., as reported by the UE 120, as described with regard to reference number 515 and/or 0), $N_2$ is a value provided by a communication standard and may be based at least in part on a UE processing capability, κ is a constant, $T_c$ is a time unit that is based at least in part on the system sampling rate, u is a subcarrier spacing, $d_{2,1}$=0 if a first symbol of the uplink grant (e.g., a PUSCH allocation) consists of DMRS only (and is equal to 1 otherwise), $d_2$ for a PUSCH of a higher priority than PUCCH is set as reported by the UE (and is equal to 0 otherwise), Text is set as reported for operation with shared spectrum channel access in FR1 (and is equal to 0 otherwise), $T_{switch}$ equals a switching gap duration for uplink transmit carrier switching (and is equal to 0 otherwise for no uplink transmit carrier switching), and $d_{2,2}$ is a BWP switching time when BWP switching is triggered (and is equal to 0 when BWP switching is not triggered).

As a second example, a preparation time may be computed as follows:

$$T_{proc,2} = \max((N_2 + d_{2,1} + d_2)(2048 + 144) \cdot \kappa 2^{-\mu} \cdot T_c + T_{ext} + T_{swtich}, T_{AS}, d_{2,2})$$

where $T_{AS}$ is an antenna switching time that is relative to another PUSCH preparation operation indicated by the UE 120 as at least part of UE capability reporting for an enabled antenna switching state and 0 for a disabled antenna switching state, and other variables are as described above with regard to the first example.

As a third example, a preparation time may be computed as follows:

$$T_{proc,2} = \max((N_2 + N_{AS} + d_{2,1} + d_2)(2048 + 144) \cdot \kappa 2^{-\mu} \cdot T_c + T_{ext} + T_{swtich}, d_{2,2}) \text{ sec}$$

where $N_{AS}$ is a relative antenna switching time in units of slots for an enabled antenna switching state and 0 for a disabled antenna switching state, and other variables are as described above with regard to the first example and the second example. Accordingly, the UE 120 (and/or the network node 110) may calculate a preparation time based at least in part on an antenna switching state by using a non-zero value as the antenna switching time delay for an enabled antenna switching state and using a zero value as the antenna switching time delay for a disabled switching state. Alternatively, or additionally, the antenna switching time delay may be configured as an explicit antenna switching time delay as described with regard to the first example, a relative antenna switching time delay that is relative to one or more other PUSCH preparation operations by the UE as described with regard to the second example, and/or a relative antenna switching time delay that is based at least in part on units of time slots.

Based at least in part on computing the preparation time, the UE 120 may transmit, and the network node 110 may receive, the uplink transmission after expiration of the preparation time, and the preparation time may include a non-zero value for the antenna switching time delay. Accordingly, the UE 120 may transmit, and the network node 110 may receive, the uplink transmission after expiration of a non-zero value for the antenna switching time delay. In some aspects, the UE 120 may transmit, and the network node may receive, the uplink transmission in a slot that occurs after the expiration of the antenna switching time delay. Prior to expiration of the preparation time and/or the antenna switching time delay, the UE 120 may not transmit, and the network node 110 may not detect, any uplink transmissions. That is, the UE 120 may transmit zero uplink transmissions prior to expiration of the preparation time and/or the antenna switching time delay, and/or the network node 110 may detect zero uplink transmissions from the UE 120 prior to the expiration of the antenna switching time delay.

Indicating a network-node-based uplink antenna selection that is linked to (e.g., associated with) specific precoding may mitigate signal degradation that is associated with a UE using downlink measurement metrics to select an uplink antenna configuration in a scenario that includes a lack of reciprocity between a downlink channel and an uplink channel. Instead, and as described herein, a network node may select the antenna configuration based at least in part on one or more reference signals that use an existing uplink channel between the network node and a UE. Mitigating such signal degradation may result in an antenna configuration that is associated with a higher signal quality (e.g., a higher signal power level and/or a lower interference power level), leading to reduced recovery errors, reduced data transfer delays, and/or increased data throughput in a wireless network.

Alternatively, or additionally, the use of a network-node-based uplink antenna selection that is linked to specific precoding may be supported by a larger variety of UEs relative to reuse of an uplink MIMO framework. The ability for a network node to select an uplink antenna configuration in a manner that is supported by a larger variety of UEs may mitigate signal degradation in a wireless network by reducing the number of UEs selecting a sub-optimal antenna configuration using a downlink measurement metric, resulting in reduced recovery errors, reduced data transfer delays, and/or increased data throughput in the wireless network.

By indicating an antenna switching time delay, a UE may enable synchronized communications with a network node that mitigate signal degradation that is due to unsettled hardware. That is, the indication and/or use of the antenna switching time delay may ensure a smooth transition (e.g., hardware settling) between uplink antenna configurations and/or mitigate interference by the UE in other communications. Mitigating signal degradation and/or interference may result in decreased recovery errors, decreased data transfer delays, and/or increased data throughput in a wireless network.

As indicated above, FIG. 5 is provided as an example. Other examples may differ from what is described with regard to FIG. 5.

Figure 6:
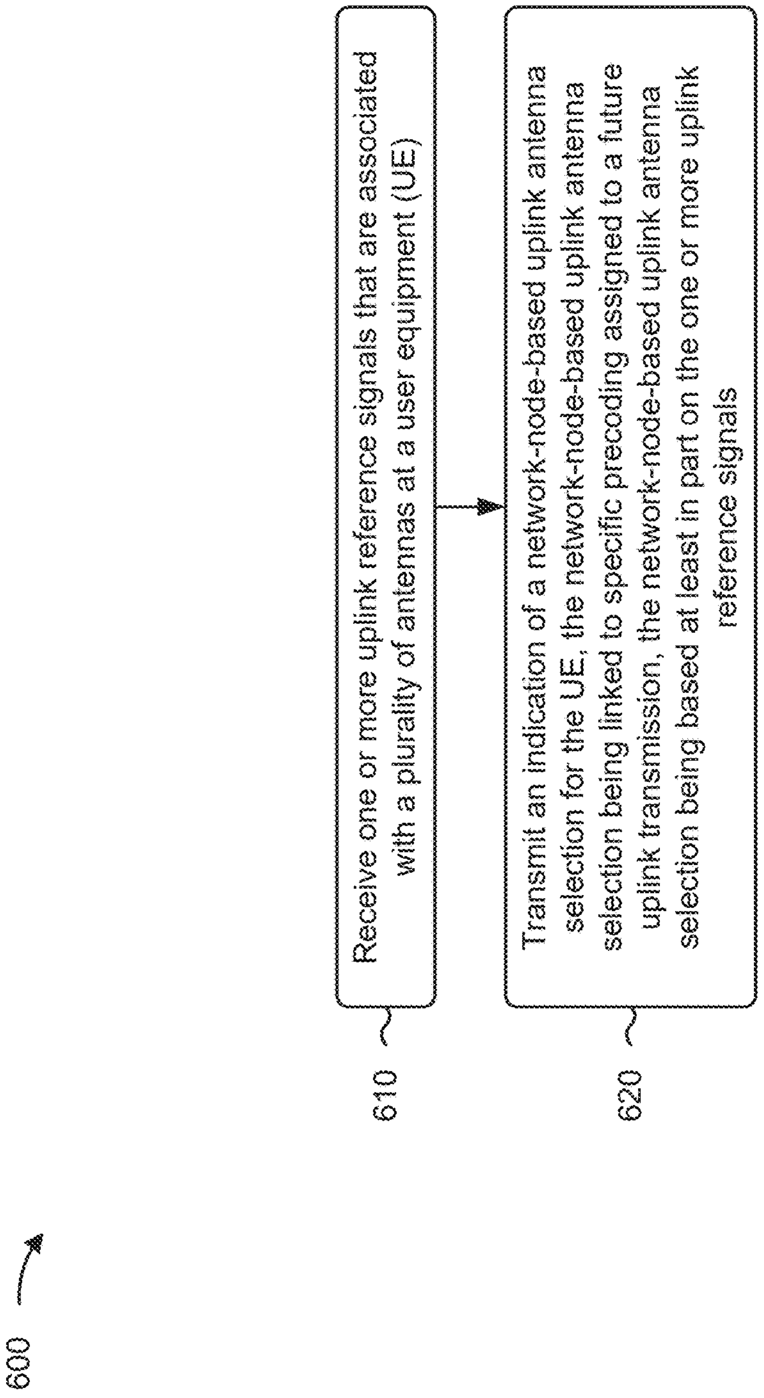
FIG. 6 is a diagram illustrating an example process performed, for example, at a network node or an apparatus of a network node, in accordance with the present disclosure.

FIG. 6 is a diagram illustrating an example process 600 performed, for example, at a network node or an apparatus of a network node, in accordance with the present disclosure. Example process 600 is an example where the apparatus or the network node (e.g., network node 110) performs operations associated with techniques for control signaling for closed-loop antenna selection.

As shown in FIG. 6, in some aspects, process 600 may include receiving one or more uplink reference signals that are associated with a plurality of antennas at a UE (block 610). For example, the network node (e.g., using reception component 1002 and/or communication manager 1006, depicted in FIG. 10) may receive one or more uplink reference signals that are associated with a plurality of antennas at a UE, as described above.

As further shown in FIG. 6, in some aspects, process 600 may include transmitting an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals (block 620). For example, the network node (e.g., using transmission component 1004 and/or communication manager 1006, depicted in FIG. 10) may transmit an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals, as described above.

Process 600 may include additional aspects, such as any single aspect or any combination of aspects described below and/or in connection with one or more other processes described elsewhere herein.

In a first aspect, transmitting the indication of the network-node-based uplink antenna selection includes transmitting the indication of the network-node-based uplink antenna selection in DCI.

In a second aspect, the DCI is an uplink grant DCI that indicates an uplink grant for the future uplink transmission, and the uplink grant DCI indicates, in addition to the network-node-based uplink antenna selection, a TPMI to use for the future uplink transmission.

In a third aspect, the future uplink transmission is a PUSCH transmission.

In a fourth aspect, process 600 includes computing a joint optimization between one or more potential antenna selections and a precoding matrix to determine the network-node-based uplink antenna selection.

In a fifth aspect, transmitting the indication of the network-node-based uplink antenna selection includes transmitting the indication of the network-node-based uplink antenna selection in at least one of a MAC CE, or RRC signaling.

In a sixth aspect, the indication of the network-node-based uplink antenna selection is a first indication, and process 600 includes selecting the network-node-based uplink antenna selection using one or more antenna selection reference signals that are transmitted as part of an antenna selection procedure, selecting a precoding matrix using one or more non-antenna selection reference signals that are not transmitted as part of the antenna selection procedure, and transmitting a second indication of the precoding matrix in uplink grant DCI, the uplink grant DCI indicating an uplink grant assigned to the future uplink transmission, the precoding matrix being assigned to the future uplink transmission.

In a seventh aspect, the one or more non-antenna selection reference signals includes one or more sounding reference signals that are configured with codebook usage.

In an eighth aspect, the uplink grant DCI indicates a transmission RI to use for the future uplink transmission.

In a ninth aspect, the network-node-based uplink antenna selection indicates a plurality of antenna selections, and the network-node-based uplink antenna selection indicates a respective rank for each antenna selection of the plurality of antenna selections.

In a tenth aspect, process 600 includes computing the network-node-based uplink antenna selection based at least in part on non-coherent codebook usage.

In an eleventh aspect, computing the network-node-based uplink antenna selection includes optimizing a signal strength metric, or optimizing a balance between the signal strength metric and an antenna correlation that satisfies a low correlation threshold.

In a twelfth aspect, the network-node-based uplink antenna selection indicates a plurality of antenna selections, and the network-node-based uplink antenna selection indicates a respective codebook type for each antenna selection of the plurality of antenna selections.

In a thirteenth aspect, process 600 includes computing the network-node-based uplink antenna selection based at least in part on UE support for coherent precoding.

In a fourteenth aspect, computing the network-node-based uplink antenna selection includes optimizing a balance between a signal strength metric and an antenna correlation that satisfies a high coherence threshold.

In a fifteenth aspect, the indication of the network-node-based uplink antenna selection is a first indication, the network-node-based uplink antenna selection is a proposed uplink antenna selection, and process 600 includes receiving a second indication of a UE-based antenna selection, and communicating with the UE based at least in part on the UE-based antenna selection.

In a sixteenth aspect, the indication of the network-node-based uplink antenna selection is a first indication, and process 600 includes receiving a second indication of a UE capability that indicates an antenna switching time delay of the UE that is associated with using the network-node-based uplink antenna selection, and receiving the future uplink transmission based at least in part on the antenna switching time delay.

In a seventeenth aspect, receiving the future uplink transmission based at least in part on the antenna switching time delay includes receiving the future uplink transmission after expiration of the antenna switching time delay.

In an eighteenth aspect, receiving the future uplink transmission based at least in part on the antenna switching time delay includes receiving the future uplink transmission in a slot that occurs after the expiration of the antenna switching time delay.

In a nineteenth aspect, process 600 includes detecting zero uplink transmissions from the UE prior to the expiration of the antenna switching time delay.

In a twentieth aspect, process 600 includes transmitting a third indication of an uplink grant for the future uplink transmission, the uplink grant being based at least in part on the antenna switching time delay.

In a twenty-first aspect, the antenna switching time delay is used to compute a PUSCH preparation time.

In a twenty-second aspect, the antenna switching delay value includes an explicit antenna switching time delay, a first relative antenna switching time delay that is relative to one or more other PUSCH preparation operations by the UE, or a second relative antenna switching time delay that based at least in part on a unit of time slots.

In a twenty-third aspect, the antenna switching delay value is based at least in part on an antenna switching state that is relative to the UE using the network-node-based uplink antenna selection.

In a twenty-fourth aspect, process 600 includes transmitting a fourth indication of the antenna switching state in DCI, and the antenna switching state indicates the antenna switching delay value.

In a twenty-fifth aspect, the antenna switching state is enabled, and the PUSCH preparation time is based at least in part on a non-zero value for the antenna switching time delay.

In a twenty-sixth aspect, the antenna switching state is disabled, and the PUSCH preparation time is based at least in part on using a zero value for the antenna switching time delay.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
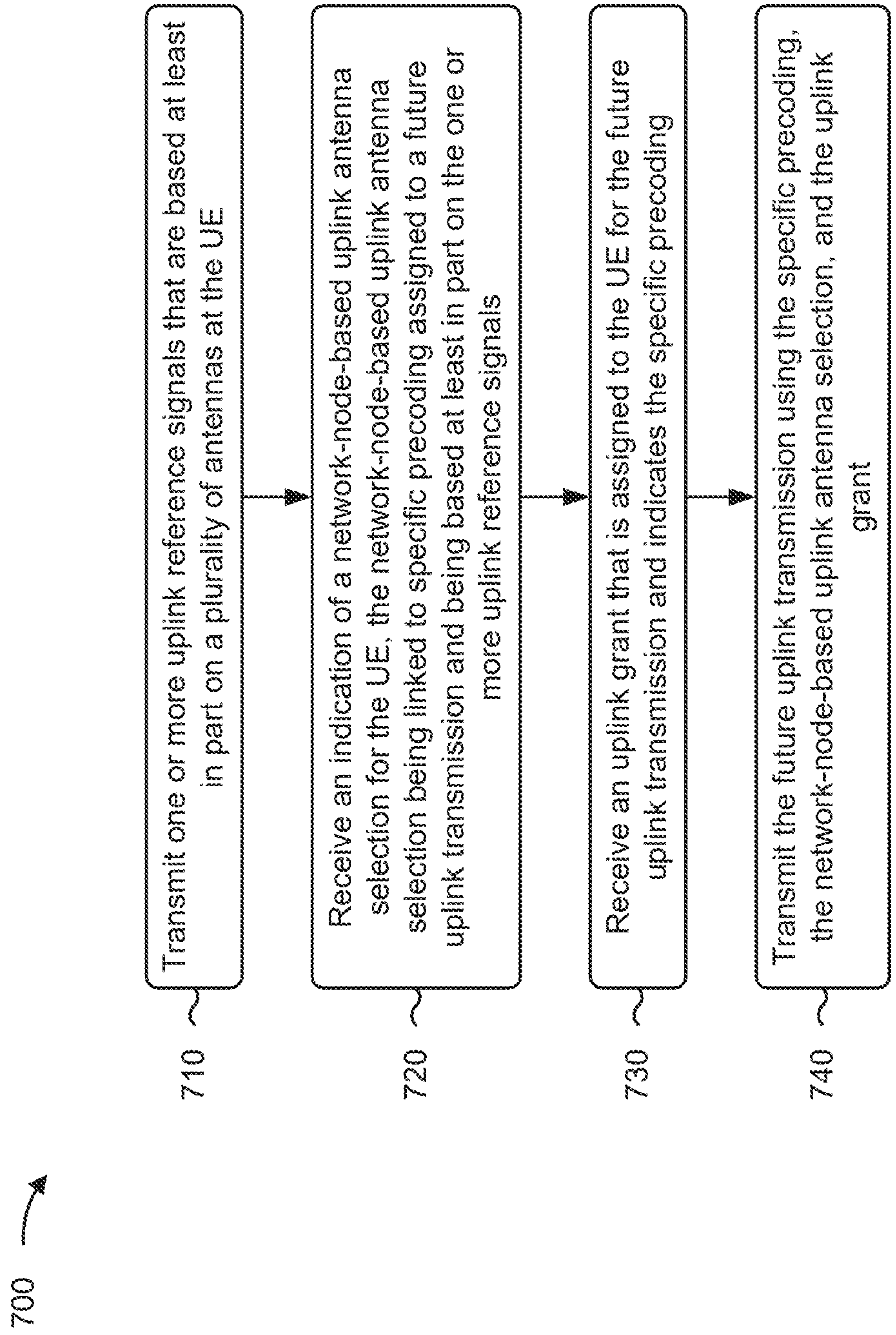
FIG. 7 is a diagram illustrating an example process performed, for example, at a UE or an apparatus of a UE, in accordance with the present disclosure.

FIG. 7 is a diagram illustrating an example process 700 performed, for example, at a UE or an apparatus of a UE, in accordance with the present disclosure. Example process 700 is an example where the apparatus or the UE (e.g., UE 120) performs operations associated with techniques for control signaling for closed-loop antenna selection.

As shown in FIG. 7, in some aspects, process 700 may include transmitting one or more uplink reference signals that are based at least in part on a plurality of antennas at the UE (block 710). For example, the UE (e.g., using transmission component 1104 and/or communication manager 1106, depicted in FIG. 11) may transmit one or more uplink reference signals that are based at least in part on a plurality of antennas at the UE, as described above.

As further shown in FIG. 7, in some aspects, process 700 may include receiving an indication of a network-node-based uplink antenna selection for the UE, the network-node-based uplink antenna selection being linked to specific precoding assigned to a future uplink transmission and being based at least in part on the one or more uplink reference signals (block 720). For example, the UE (e.g., using reception component 1102 and/or communication manager 1106, depicted in FIG. 11) may receive an indication of a network-node-based uplink antenna selection for the UE, the network-node-based uplink antenna selection being linked to specific precoding assigned to a future uplink transmission and being based at least in part on the one or more uplink reference signals, as described above.

As further shown in FIG. 7, in some aspects, process 700 may include receiving an uplink grant that is assigned to the UE for the future uplink transmission and indicates the specific precoding (block 730). For example, the UE (e.g., using reception component 1102 and/or communication manager 1106, depicted in FIG. 11) may receive an uplink grant that is assigned to the UE for the future uplink transmission and indicates the specific precoding, as described above.

As further shown in FIG. 7, in some aspects, process 700 may include transmitting the future uplink transmission using the specific precoding, the network-node-based uplink antenna selection, and the uplink grant (block 740). For example, the UE (e.g., using transmission component 1104 and/or communication manager 1106, depicted in FIG. 11) may transmit the future uplink transmission using the specific precoding, the network-node-based uplink antenna selection, and the uplink grant, as described above.

Process 700 may include additional aspects, such as any single aspect or any combination of aspects described below and/or in connection with one or more other processes described elsewhere herein.

In a first aspect, receiving the indication of the network-node-based uplink antenna selection includes receiving the indication of the network-node-based uplink antenna selection in DCI.

In a second aspect, the DCI is an uplink grant DCI that indicates the uplink grant that is assigned to the UE, and the uplink grant DCI indicates, in addition to the network-node-based uplink antenna selection, a TPMI for the future uplink transmission.

In a third aspect, the future uplink transmission is a PUSCH transmission.

In a fourth aspect, receiving the indication of the network-node-based uplink antenna selection includes receiving the indication of the network-node-based uplink antenna selection in at least one of a MAC CE, or RRC signaling.

In a fifth aspect, the indication of the network-node-based uplink antenna selection is a first indication, and process 700 includes receiving a second indication of the uplink grant in uplink grant DCI, and the uplink grant DCI indicates a precoding matrix to use for the future uplink transmission.

In a sixth aspect, the uplink grant DCI indicates a transmission RI to use for the future uplink transmission.

In a seventh aspect, the network-node-based uplink antenna selection indicates a plurality of antenna selections, and the network-node-based uplink antenna selection indicates a respective rank for each antenna selection of the plurality of antenna selections.

In an eighth aspect, the network-node-based uplink antenna selection indicates a plurality of antenna selections, and the network-node-based uplink antenna selection indicates a respective codebook type for each antenna selection of the plurality of antenna selections.

In a ninth aspect, the indication of the network-node-based uplink antenna selection is a first indication, the network-node-based uplink antenna selection is a proposed uplink antenna selection, and process 700 includes transmitting a second indication of a UE-based antenna selection, and communicating with a network node based at least in part on the UE-based antenna selection.

In a tenth aspect, the indication of the network-node-based uplink antenna selection is a first indication, and process 700 includes transmitting a second indication of a UE capability that indicates an antenna switching time delay of the UE that is associated with using the network-node-based uplink antenna selection, and transmitting the future uplink transmission based at least in part on the antenna switching time delay.

In an eleventh aspect, transmitting the future uplink transmission based at least in part on the antenna switching time delay includes transmitting the future uplink transmission after expiration of the antenna switching time delay.

In a twelfth aspect, transmitting the future uplink transmission based at least in part on the antenna switching time delay includes transmitting the future uplink transmission in a slot that occurs after the expiration of the antenna switching time delay.

In a thirteenth aspect, process 700 includes refraining from transmitting any uplink transmissions prior to the expiration of the antenna switching time delay.

In a fourteenth aspect, the uplink grant is based at least in part on the antenna switching time delay.

In a fifteenth aspect, the uplink grant is based at least in part on an antenna switching delay value that is used to compute a PUSCH preparation time.

In a sixteenth aspect, the antenna switching delay value includes an explicit antenna switching time delay, a first relative antenna switching time delay that is relative to one or more other PUSCH preparation operations by the UE, or a second relative antenna switching time delay that based at least in part on a unit of time slots.

In a seventeenth aspect, the antenna switching delay value is based at least in part on an antenna switching state that is relative to the UE using the network-node-based uplink antenna selection.

In an eighteenth aspect, process 700 includes receiving a fourth indication of the antenna switching state in DCI, and the antenna switching state indicates the antenna switching delay value.

In a nineteenth aspect, process 700 includes deriving the antenna switching state and the antenna switching delay value based at least in part on a prior network-node-based uplink antenna selection indication.

In a twentieth aspect, the antenna switching state is enabled, and the PUSCH preparation time is based at least in part on a non-zero value for the antenna switching time delay.

In a twenty-first aspect, the antenna switching state is disabled, and the PUSCH preparation time is based at least in part on using a zero value for the antenna switching time delay.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
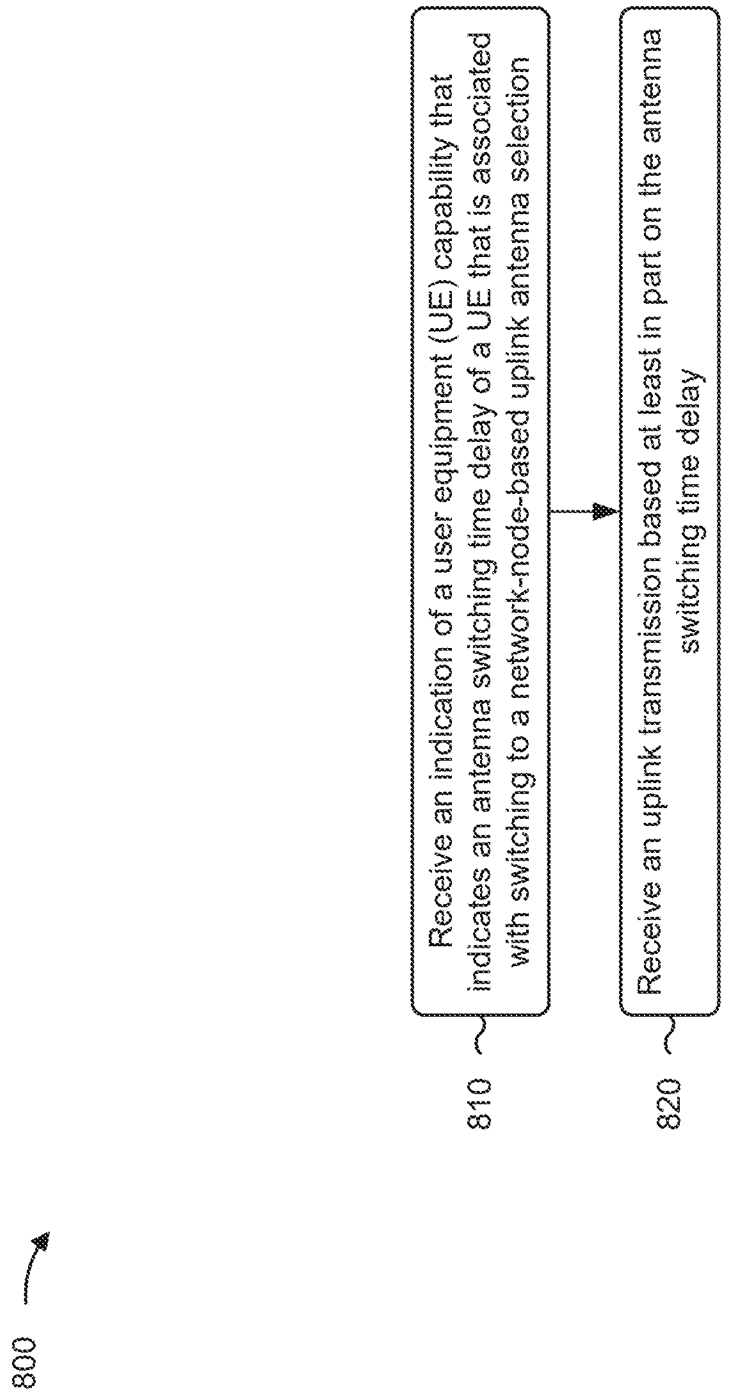
FIG. 8 is a diagram illustrating an example process performed, for example, at a network node or an apparatus of a network node, in accordance with the present disclosure.

FIG. 8 is a diagram illustrating an example process 800 performed, for example, at a network node or an apparatus of a network node, in accordance with the present disclosure. Example process 800 is an example where the apparatus or the network node (e.g., network node 110) performs operations associated with techniques for control signaling for closed-loop antenna selection.

As shown in FIG. 8, in some aspects, process 800 may include receiving an indication of a UE capability that indicates an antenna switching time delay of a UE that is associated with switching to a network-node-based uplink antenna selection (block 810). For example, the network node (e.g., using reception component 1002 and/or communication manager 1006, depicted in FIG. 10) may receive an indication of a UE capability that indicates an antenna switching time delay of a UE that is associated with switching to a network-node-based uplink antenna selection, as described above.

As further shown in FIG. 8, in some aspects, process 800 may include receiving an uplink transmission based at least in part on the antenna switching time delay (block 820). For example, the network node (e.g., using reception component 1002 and/or communication manager 1006, depicted in FIG. 10) may receive an uplink transmission based at least in part on the antenna switching time delay, as described above.

Process 800 may include additional aspects, such as any single aspect or any combination of aspects described below and/or in connection with one or more other processes described elsewhere herein.

In a first aspect, receiving the uplink transmission based at least in part on the antenna switching time delay includes receiving the uplink transmission after expiration of the antenna switching time delay.

In a second aspect, receiving the uplink transmission based at least in part on the antenna switching time delay includes receiving the uplink transmission in a slot that occurs after the expiration of the antenna switching time delay.

In a third aspect, process 800 includes detecting zero uplink transmissions from the UE prior to the expiration of the antenna switching time delay.

In a fourth aspect, the indication of the UE capability is a first indication, and process 800 includes transmitting a second indication of an uplink grant for the uplink transmission, the uplink grant being based at least in part on the antenna switching time delay.

In a fifth aspect, the uplink grant is based at least in part on an antenna switching delay value that is used to compute a PUSCH preparation time.

In a sixth aspect, the antenna switching delay value includes an explicit antenna switching time delay, a first relative antenna switching time delay that is relative to one or more other PUSCH preparation operations by the UE, or a second relative antenna switching time delay that based at least in part on a unit of time slots.

In a seventh aspect, the antenna switching delay value is based at least in part on an antenna switching state that is relative to the UE using the network-node-based uplink antenna selection.

In an eighth aspect, process 800 includes transmitting a third indication of the antenna switching state in DCI, and the antenna switching state indicates the antenna switching delay value.

In a ninth aspect, the antenna switching state is enabled, and the PUSCH preparation time is based at least in part on a non-zero value for the antenna switching time delay.

In a tenth aspect, the antenna switching state is disabled, and the PUSCH preparation time is based at least in part on using a zero value for the antenna switching time delay.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
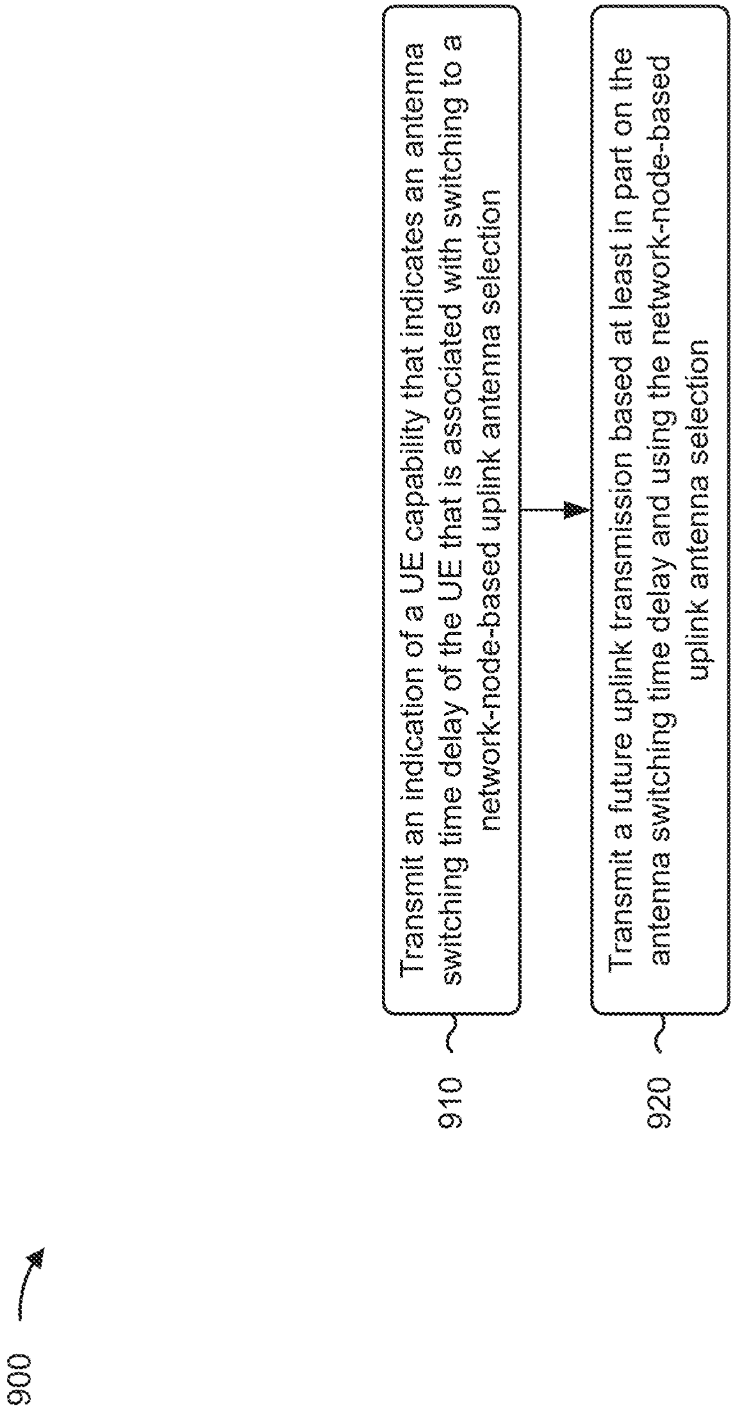
FIG. 9 is a diagram illustrating an example process performed, for example, at a UE or an apparatus of a UE, in accordance with the present disclosure.

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with techniques for control signaling for closed-loop antenna selection.

As shown in FIG. 9, in some aspects, process 900 may include transmitting an indication of a UE capability that indicates an antenna switching time delay of the UE that is associated with switching to a network-node-based uplink antenna selection (block 910). For example, the UE (e.g., using transmission component 1104 and/or communication manager 1106, depicted in FIG. 11) may transmit an indication of a UE capability that indicates an antenna switching time delay of the UE that is associated with switching to a network-node-based uplink antenna selection, as described above.

As further shown in FIG. 9, in some aspects, process 900 may include transmitting a future uplink transmission based at least in part on the antenna switching time delay and using the network-node-based uplink antenna selection (block 920). For example, the UE (e.g., using transmission component 1104 and/or communication manager 1106, depicted in FIG. 11) may transmit a future uplink transmission based at least in part on the antenna switching time delay and using the network-node-based uplink antenna selection, as described above.

Process 900 may include additional aspects, such as any single aspect or any combination of aspects described below and/or in connection with one or more other processes described elsewhere herein.

In a first aspect, transmitting the future uplink transmission based at least in part on the antenna switching time delay includes transmitting the future uplink transmission after expiration of the antenna switching time delay.

In a second aspect, transmitting the future uplink transmission based at least in part on the antenna switching time delay includes transmitting the future uplink transmission in a slot that occurs after the expiration of the antenna switching time delay.

In a third aspect, process 900 includes refraining from transmitting any uplink transmissions prior to the expiration of the antenna switching time delay.

In a fourth aspect, the indication of the UE capability is a first indication, and process 900 includes receiving a second indication of an uplink grant for the future uplink transmission, the uplink grant being based at least in part on the antenna switching time delay.

In a fifth aspect, the uplink grant is based at least in part on an antenna switching delay value that is used to compute a PUSCH preparation time.

In a sixth aspect, the antenna switching delay value includes an explicit antenna switching time delay, a first relative antenna switching time delay that is relative to one or more other PUSCH preparation operations by the UE, or a second relative antenna switching time delay that based at least in part on a unit of time slots.

In a seventh aspect, the antenna switching delay value is based at least in part on an antenna switching state that is relative to the UE using the network-node-based uplink antenna selection.

In an eighth aspect, process 900 includes receiving a fourth indication of the antenna switching state in DCI, and the antenna switching state indicates the antenna switching delay value.

In a ninth aspect, process 900 includes deriving the antenna switching state and the antenna switching delay value based at least in part on a prior network-node-based uplink antenna selection indication.

In a tenth aspect, the antenna switching state is enabled, and the PUSCH preparation time is based at least in part on a non-zero value for the antenna switching time delay.

In an eleventh aspect, the antenna switching state is disabled, and the PUSCH preparation time is based at least in part on using a zero value for the antenna switching time delay.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
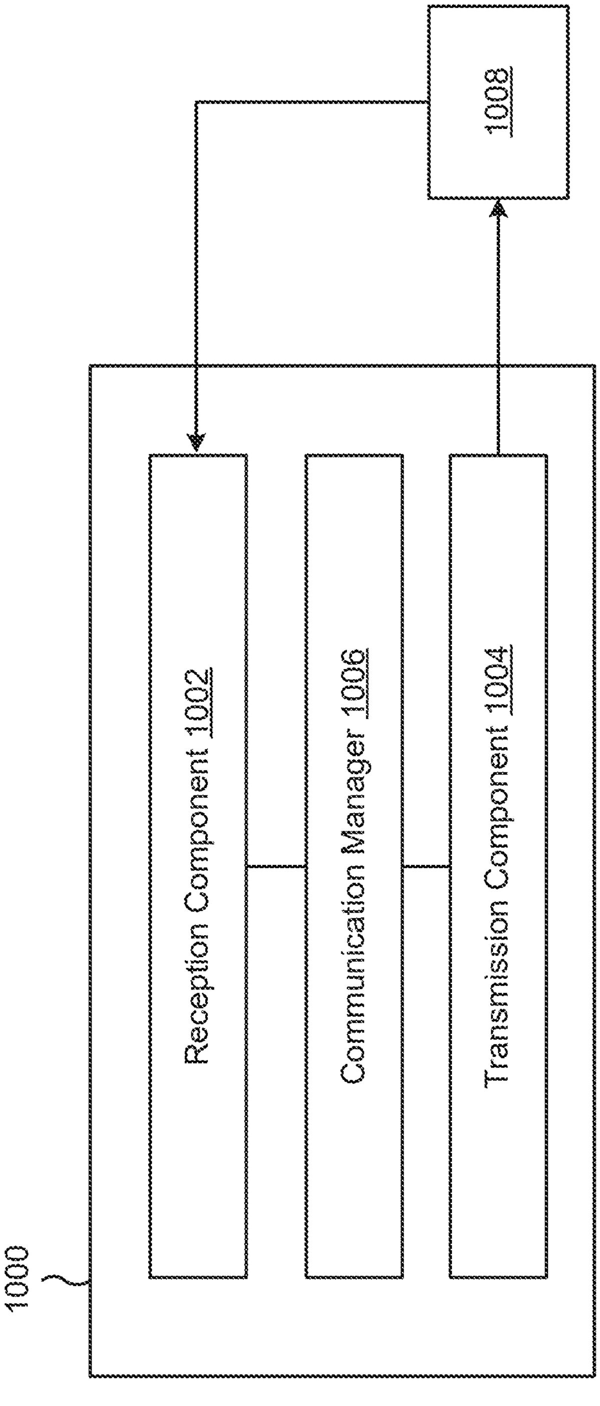
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-5. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the network node described in connection with FIG. 1 and FIG. 2. Additionally, or alternatively, one or more components shown in FIG. 10 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the network node described in connection with FIG. 1 and FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the network node described in connection with FIG. 1 and FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive one or more uplink reference signals that are associated with a plurality of antennas at a UE. The transmission component 1004 may transmit an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals.

The communication manager 1006 may compute a joint optimization between one or more potential antenna selections and a precoding matrix to determine the network-node-based uplink antenna selection. Alternatively, or additionally, the communication manager 1006 may compute the network-node-based uplink antenna selection based at least in part on non-coherent codebook usage. In some aspects, the communication manager 1006 may compute the network-node-based uplink antenna selection based at least in part on UE support for coherent precoding. The communication manager 1006 may detect zero uplink transmissions from the UE prior to the expiration of the antenna switching time delay.

The transmission component 1004 may transmit a third indication of an uplink grant for the future uplink transmission, the uplink grant being based at least in part on the antenna switching time delay. Alternatively, or additionally, the transmission component 1004 may transmit a fourth indication of the antenna switching state in DCI, and the antenna switching state indicates the antenna switching delay value.

The reception component 1002 may receive an indication of a UE capability that indicates an antenna switching time delay of a UE that is associated with switching to a network-node-based uplink antenna selection. The reception component 1002 may receive an uplink transmission based at least in part on the antenna switching time delay. In some aspects, the communication manager 1006 may detect zero uplink transmissions from the UE prior to the expiration of the antenna switching time delay. Alternatively, or additionally, the transmission component 1004 may transmit a third indication of the antenna switching state in DCI, and the antenna switching state indicates the antenna switching delay value.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
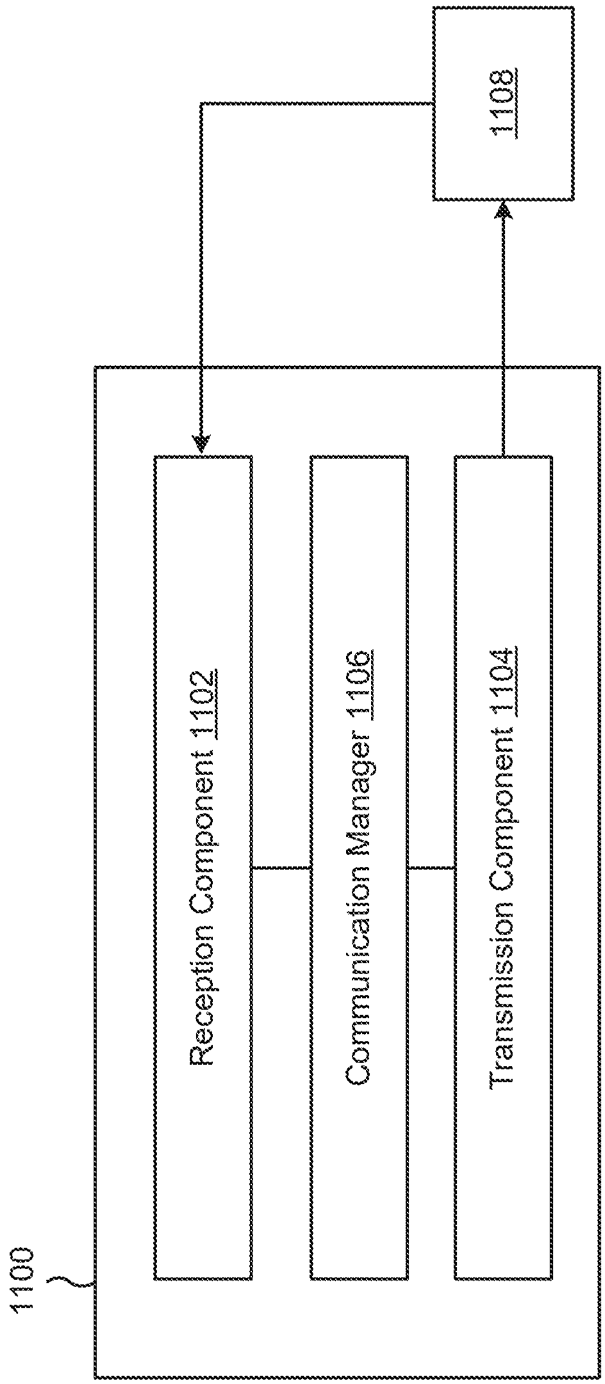
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-5. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the UE described in connection with FIG. 1 and FIG. 2. Additionally, or alternatively, one or more components shown in FIG. 11 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 1 and FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 1 and FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/ or provide control information to the reception component 1102 and/or the transmission component 1104 to control reception and/or transmission of communications.

The transmission component 1104 may transmit one or more uplink reference signals that are based at least in part on a plurality of antennas at the UE. The reception component 1102 may receive an indication of a network-node-based uplink antenna selection for the UE, the network-node-based uplink antenna selection being linked to specific precoding assigned to a future uplink transmission and being based at least in part on the one or more uplink reference signals. The reception component 1102 may receive an uplink grant that is assigned to the UE for the future uplink transmission and indicates the specific precoding. The transmission component 1104 may transmit the future uplink transmission using the specific precoding, the network-node-based uplink antenna selection, and the uplink grant.

The communication manager 1106 may refrain from transmitting any uplink transmissions prior to the expiration of the antenna switching time delay. In some aspects, the reception component 1102 may receive an indication of the antenna switching state in DCI, and the antenna switching state indicates the antenna switching delay value. Alternatively, or additionally, the communication manager 1106 may derive the antenna switching state and the antenna switching delay value based at least in part on a prior network-node-based uplink antenna selection indication.

The transmission component 1104 may transmit an indication of a UE capability that indicates an antenna switching time delay of the UE that is associated with switching to a network-node-based uplink antenna selection. The transmission component 1104 may transmit a future uplink transmission based at least in part on the antenna switching time delay and using the network-node-based uplink antenna selection.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving one or more uplink reference signals that are associated with a plurality of antennas at a user equipment (UE); and transmitting an indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals.

Aspect 2: The method of Aspect 1, wherein transmitting the indication of the network-node-based uplink antenna selection comprises: transmitting the indication of the network-node-based uplink antenna selection in downlink control information (DCI).

Aspect 3: The method of Aspect 2, wherein the DCI is an uplink grant DCI that indicates an uplink grant for the future uplink transmission, and wherein the uplink grant DCI indicates, in addition to the network-node-based uplink antenna selection, a transmit precoding matrix indicator (TPMI) to use for the future uplink transmission.

Aspect 4: The method of any one of Aspects 1-3, wherein the future uplink transmission is a physical uplink shared channel (PUSCH) transmission.

Aspect 5: The method of Aspect 1 or Aspect 2, further comprising: computing a joint optimization between one or more potential antenna selections and a precoding matrix to determine the network-node-based uplink antenna selection.

Aspect 6: The method of any of Aspects 1-5, wherein transmitting the indication of the network-node-based uplink antenna selection comprises: transmitting the indication of the network-node-based uplink antenna selection in at least one of: a medium access control (MAC) control element (CE), or radio resource control (RRC) signaling.

Aspect 7: The method of Aspect 6, wherein the indication of the network-node-based uplink antenna selection is a first indication, and wherein the method further comprises: selecting the network-node-based uplink antenna selection using one or more antenna selection reference signals that are transmitted as part of an antenna selection procedure; selecting a precoding matrix using one or more non-antenna selection reference signals that are not transmitted as part of the antenna selection procedure; and transmitting a second indication of the precoding matrix in uplink grant downlink control information (DCI), the uplink grant DCI indicating an uplink grant assigned to the future uplink transmission, the precoding matrix being assigned to the future uplink transmission.

Aspect 8: The method of Aspect 7, wherein the one or more non-antenna selection reference signals comprise one or more sounding reference signals that are configured with codebook usage.

Aspect 9: The method of Aspect 7 or Aspect 8, wherein the uplink grant DCI indicates a transmission rank indicator (RI) to use for the future uplink transmission.

Aspect 10: The method of any of Aspects 1-9, wherein the network-node-based uplink antenna selection indicates a plurality of antenna selections, and wherein the network-node-based uplink antenna selection indicates a respective rank for each antenna selection of the plurality of antenna selections.

Aspect 11: The method of Aspect 10, further comprising: computing the network-node-based uplink antenna selection based at least in part on non-coherent codebook usage.

Aspect 12: The method of Aspect 11, wherein computing the network-node-based uplink antenna selection comprises: optimizing a signal strength metric, or optimizing a balance between the signal strength metric and an antenna correlation that satisfies a low correlation threshold.

Aspect 13: The method of any of Aspects 1-12, wherein the network-node-based uplink antenna selection indicates a plurality of antenna selections, and wherein the network-node-based uplink antenna selection indicates a respective codebook type for each antenna selection of the plurality of antenna selections.

Aspect 14: The method of Aspect 13, further comprising: computing the network-node-based uplink antenna selection based at least in part on UE support for coherent precoding.

Aspect 15: The method of Aspect 14, wherein computing the network-node-based uplink antenna selection comprises: optimizing a balance between a signal strength metric and an antenna correlation that satisfies a high coherence threshold.

Aspect 16: The method of any of Aspects 1-15, wherein the indication of the network-node-based uplink antenna selection is a first indication, wherein the network-node-based uplink antenna selection is a proposed uplink antenna selection, and wherein the method further comprises: receiving a second indication of a UE-based antenna selection; and communicating with the UE based at least in part on the UE-based antenna selection.

Aspect 17: The method of any of Aspects 1-16, wherein the indication of the network-node-based uplink antenna selection is a first indication, and wherein the method further comprises: receiving a second indication of a UE capability that indicates an antenna switching time delay of the UE that is associated with using the network-node-based uplink antenna selection; and receiving the future uplink transmission based at least in part on the antenna switching time delay.

Aspect 18: The method of Aspect 17, wherein receiving the future uplink transmission based at least in part on the antenna switching time delay comprises: receiving the future uplink transmission after expiration of the antenna switching time delay.

Aspect 19: The method of Aspect 18, wherein receiving the future uplink transmission based at least in part on the antenna switching time delay comprises: receiving the future uplink transmission in a slot that occurs after the expiration of the antenna switching time delay.

Aspect 20: The method of Aspect 18 or Aspect 19, further comprising: detecting zero uplink transmissions from the UE prior to the expiration of the antenna switching time delay.

Aspect 21: The method of any one of Aspects 17-19, further comprising: transmitting a third indication of an uplink grant for the future uplink transmission, the uplink grant being based at least in part on the antenna switching time delay.

Aspect 22: The method of Aspect 21, wherein the antenna switching time delay is used to compute a physical uplink shared channel (PUSCH) preparation time.

Aspect 23: The method of Aspect 22, wherein the antenna switching delay value comprises: an explicit antenna switching time delay, a first relative antenna switching time delay that is relative to one or more other PUSCH preparation operations by the UE, or a second relative antenna switching time delay that based at least in part on a unit of time slots.

Aspect 24: The method of Aspect 22 or Aspect 23, wherein the antenna switching delay value is based at least in part on an antenna switching state that is relative to the UE using the network-node-based uplink antenna selection.

Aspect 25: The method of Aspect 24, further comprising: transmitting a fourth indication of the antenna switching state in downlink control information (DCI), wherein the antenna switching state indicates the antenna switching delay value.

Aspect 26: The method of any one of Aspects 22-25, wherein the antenna switching state is enabled, and wherein the PUSCH preparation time is based at least in part on a non-zero value for the antenna switching time delay.

Aspect 27: The method of any one of Aspects 22-26, wherein the antenna switching state is disabled, and wherein the PUSCH preparation time is based at least in part on using a zero value for the antenna switching time delay.

Aspect 28: A method of wireless communication performed by a user equipment (UE), comprising: transmitting one or more uplink reference signals that are based at least in part on a plurality of antennas at the UE; receiving an indication of a network-node-based uplink antenna selection for the UE, the network-node-based uplink antenna selection being linked to specific precoding assigned to a future uplink transmission and being based at least in part on the one or more uplink reference signals; and receiving an uplink grant that is assigned to the UE for the future uplink transmission and indicates the specific precoding; and transmitting the future uplink transmission using the specific precoding, the network-node-based uplink antenna selection, and the uplink grant.

Aspect 29: The method of Aspect 28, wherein receiving the indication of the network-node-based uplink antenna selection comprises: receiving the indication of the network-node-based uplink antenna selection in downlink control information (DCI).

Aspect 30: The method of Aspect 29, wherein the DCI is an uplink grant DCI that indicates the uplink grant that is assigned to the UE, and wherein the uplink grant DCI indicates, in addition to the network-node-based uplink antenna selection, a transmit precoding matrix indicator (TPMI) for the future uplink transmission.

Aspect 31: The method of Aspect 30, wherein the future uplink transmission is a physical uplink shared channel (PUSCH) transmission.

Aspect 32: The method of any of Aspects 28-31, wherein receiving the indication of the network-node-based uplink antenna selection comprises: receiving the indication of the network-node-based uplink antenna selection in at least one of: a medium access control (MAC) control element (CE), or radio resource control (RRC) signaling.

Aspect 33: The method of Aspect 32, wherein the indication of the network-node-based uplink antenna selection is a first indication, and wherein the method further comprises: receiving a second indication of the uplink grant in uplink grant downlink control information (DCI), wherein the uplink grant DCI indicates a precoding matrix to use for the future uplink transmission.

Aspect 34: The method of Aspect 33, wherein the uplink grant DCI indicates a transmission rank indicator (RI) to use for the future uplink transmission.

Aspect 35: The method of any of Aspects 28-34, wherein the network-node-based uplink antenna selection indicates a plurality of antenna selections, and wherein the network-node-based uplink antenna selection indicates a respective rank for each antenna selection of the plurality of antenna selections.

Aspect 36: The method of any of Aspects 28-35, wherein the network-node-based uplink antenna selection indicates a plurality of antenna selections, and wherein the network-node-based uplink antenna selection indicates a respective codebook type for each antenna selection of the plurality of antenna selections.

Aspect 37: The method of any of Aspects 28-36, wherein the indication of the network-node-based uplink antenna selection is a first indication, wherein the network-node-based uplink antenna selection is a proposed uplink antenna selection, and wherein the method further comprises: transmitting a second indication of a UE-based antenna selection; and communicating with a network node based at least in part on the UE-based antenna selection.

Aspect 38: The method of any of Aspects 28-37, wherein the indication of the network-node-based uplink antenna selection is a first indication, and wherein the method further comprises: transmitting a second indication of a UE capability that indicates an antenna switching time delay of the UE that is associated with using the network-node-based uplink antenna selection; and transmitting the future uplink transmission based at least in part on the antenna switching time delay.

Aspect 39: The method of Aspect 38, wherein transmitting the future uplink transmission based at least in part on the antenna switching time delay comprises: transmitting the future uplink transmission after expiration of the antenna switching time delay.

Aspect 40: The method of Aspect 39, wherein transmitting the future uplink transmission based at least in part on the antenna switching time delay comprises: transmitting the future uplink transmission in a slot that occurs after the expiration of the antenna switching time delay.

Aspect 41: The method of Aspect 39 or Aspect 49, further comprising: refraining from transmitting any uplink transmissions prior to the expiration of the antenna switching time delay.

Aspect 42: The method of any one of Aspects 39-41, wherein the uplink grant is based at least in part on the antenna switching time delay.

Aspect 43: The method of Aspect 42, wherein the uplink grant is based at least in part on an antenna switching delay value that is used to compute a physical uplink shared channel (PUSCH) preparation time.

Aspect 44: The method of Aspect 43, wherein the antenna switching delay value comprises: an explicit antenna switching time delay, a first relative antenna switching time delay that is relative to one or more other PUSCH preparation operations by the UE, or a second relative antenna switching time delay that based at least in part on a unit of time slots.

Aspect 45: The method of Aspect 43 or Aspect 44, wherein the antenna switching delay value is based at least in part on an antenna switching state that is relative to the UE using the network-node-based uplink antenna selection.

Aspect 46: The method of Aspect 45, further comprising: receiving a fourth indication of the antenna switching state in downlink control information (DCI), wherein the antenna switching state indicates the antenna switching delay value.

Aspect 47: The method of Aspect 45, further comprising: deriving the antenna switching state and the antenna switching delay value based at least in part on a prior network-node-based uplink antenna selection indication.

Aspect 48: The method of any one of Aspects 43-47, wherein the antenna switching state is enabled, and wherein the PUSCH preparation time is based at least in part on a non-zero value for the antenna switching time delay.

Aspect 49: The method of Aspect 43, wherein the antenna switching state is disabled, and wherein the PUSCH preparation time is based at least in part on using a zero value for the antenna switching time delay.

Aspect 50: A method of wireless communication performed by a network node, comprising: receiving an indication of a user equipment (UE) capability that indicates an antenna switching time delay of a UE that is associated with switching to a network-node-based uplink antenna selection; and receiving an uplink transmission based at least in part on the antenna switching time delay.

Aspect 51: The method of Aspect 50, wherein receiving the uplink transmission based at least in part on the antenna switching time delay comprises: receiving the uplink transmission after expiration of the antenna switching time delay.

Aspect 52: The method of Aspect 51, wherein receiving the uplink transmission based at least in part on the antenna switching time delay comprises: receiving the uplink transmission in a slot that occurs after the expiration of the antenna switching time delay.

Aspect 53: The method of Aspect 51 or Aspect 52, further comprising: detecting zero uplink transmissions from the UE prior to the expiration of the antenna switching time delay.

Aspect 54: The method of any of Aspects 50-53, wherein the indication of the UE capability is a first indication, and wherein the method further comprises: transmitting a second indication of an uplink grant for the uplink transmission, the uplink grant being based at least in part on the antenna switching time delay.

Aspect 55: The method of Aspect 54, wherein the uplink grant is based at least in part on an antenna switching delay value that is used to compute a physical uplink shared channel (PUSCH) preparation time.

Aspect 56: The method of Aspect 55, wherein the antenna switching delay value comprises: an explicit antenna switching time delay, a first relative antenna switching time delay that is relative to one or more other PUSCH preparation operations by the UE, or a second relative antenna switching time delay that based at least in part on a unit of time slots.

Aspect 57: The method of Aspect 55, wherein the antenna switching delay value is based at least in part on an antenna switching state that is relative to the UE using the network-node-based uplink antenna selection.

Aspect 58: The method of Aspect 57, further comprising: transmitting a third indication of the antenna switching state in downlink control information (DCI), wherein the antenna switching state indicates the antenna switching delay value.

Aspect 59: The method of Aspect 55, wherein the antenna switching state is enabled, and wherein the PUSCH preparation time is based at least in part on a non-zero value for the antenna switching time delay.

Aspect 60: The method of Aspect 55, wherein the antenna switching state is disabled, and wherein the PUSCH preparation time is based at least in part on using a zero value for the antenna switching time delay.

Aspect 61: A method of wireless communication performed by a user equipment (UE), comprising: transmitting an indication of a UE capability that indicates an antenna switching time delay of the UE that is associated with switching to a network-node-based uplink antenna selection; and transmitting a future uplink transmission based at least in part on the antenna switching time delay and using the network-node-based uplink antenna selection.

Aspect 62: The method of Aspect 61, wherein transmitting the future uplink transmission based at least in part on the antenna switching time delay comprises: transmitting the future uplink transmission after expiration of the antenna switching time delay.

Aspect 63: The method of Aspect 62, wherein transmitting the future uplink transmission based at least in part on the antenna switching time delay comprises: transmitting the future uplink transmission in a slot that occurs after the expiration of the antenna switching time delay.

Aspect 64: The method of Aspect 62 or Aspect 63, further comprising: refraining from transmitting any uplink transmissions prior to the expiration of the antenna switching time delay.

Aspect 65: The method of Aspect 62, wherein the indication of the UE capability is a first indication, and wherein the method further comprises: receiving a second indication of an uplink grant for the future uplink transmission, the uplink grant being based at least in part on the antenna switching time delay.

Aspect 66: The method of Aspect 65, wherein the uplink grant is based at least in part on an antenna switching delay value that is used to compute a physical uplink shared channel (PUSCH) preparation time.

Aspect 67: The method of Aspect 66, wherein the antenna switching delay value comprises: an explicit antenna switching time delay, a first relative antenna switching time delay that is relative to one or more other PUSCH preparation operations by the UE, or a second relative antenna switching time delay that based at least in part on a unit of time slots.

Aspect 68: The method of Aspect 66, wherein the antenna switching delay value is based at least in part on an antenna switching state that is relative to the UE using the network-node-based uplink antenna selection.

Aspect 69: The method of Aspect 68 further comprising: receiving a fourth indication of the antenna switching state in downlink control information (DCI), wherein the antenna switching state indicates the antenna switching delay value.

Aspect 70: The method of Aspect 68, further comprising: deriving the antenna switching state and the antenna switching delay value based at least in part on a prior network-node-based uplink antenna selection indication.

Aspect 71: The method of Aspect 66, wherein the antenna switching state is enabled, and wherein the PUSCH preparation time is based at least in part on a non-zero value for the antenna switching time delay.

Aspect 72: The method of Aspect 66, wherein the antenna switching state is disabled, and wherein the PUSCH preparation time is based at least in part on using a zero value for the antenna switching time delay.

Aspect 73: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-27.

Aspect 74: An apparatus for wireless communication at a device, the apparatus comprising one or more memories and one or more processors coupled to the one or more memories, the one or more processors configured to cause the device to perform the method of one or more of Aspects 1-27.

Aspect 75: An apparatus for wireless communication, the apparatus comprising at least one means for performing the method of one or more of Aspects 1-27.

Aspect 76: A non-transitory computer-readable medium storing code for wireless communication, the code comprising instructions executable by one or more processors to perform the method of one or more of Aspects 1-27.

Aspect 77: A non-transitory computer-readable medium storing a set of instructions for wireless communication, the set of instructions comprising one or more instructions that, when executed by one or more processors of a device, cause the device to perform the method of one or more of Aspects 1-27.

Aspect 78: A device for wireless communication, the device comprising a processing system that includes one or more processors and one or more memories coupled with the one or more processors, the processing system configured to cause the device to perform the method of one or more of Aspects 1-27.

Aspect 79: An apparatus for wireless communication at a device, the apparatus comprising one or more memories and one or more processors coupled to the one or more memories, the one or more processors individually or collectively configured to cause the device to perform the method of one or more of Aspects 1-27.

Aspect 80: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 28-49.

Aspect 81: An apparatus for wireless communication at a device, the apparatus comprising one or more memories and one or more processors coupled to the one or more memories, the one or more processors configured to cause the device to perform the method of one or more of Aspects 28-49.

Aspect 82: An apparatus for wireless communication, the apparatus comprising at least one means for performing the method of one or more of Aspects 28-49.

Aspect 83: A non-transitory computer-readable medium storing code for wireless communication, the code comprising instructions executable by one or more processors to perform the method of one or more of Aspects 28-49.

Aspect 84: A non-transitory computer-readable medium storing a set of instructions for wireless communication, the set of instructions comprising one or more instructions that, when executed by one or more processors of a device, cause the device to perform the method of one or more of Aspects 28-49.

Aspect 85: A device for wireless communication, the device comprising a processing system that includes one or more processors and one or more memories coupled with the one or more processors, the processing system configured to cause the device to perform the method of one or more of Aspects 28-49.

Aspect 86: An apparatus for wireless communication at a device, the apparatus comprising one or more memories and one or more processors coupled to the one or more memories, the one or more processors individually or collectively configured to cause the device to perform the method of one or more of Aspects 28-49.

Aspect 87: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 50-60.

Aspect 88: An apparatus for wireless communication at a device, the apparatus comprising one or more memories and one or more processors coupled to the one or more memories, the one or more processors configured to cause the device to perform the method of one or more of Aspects 50-60.

Aspect 89: An apparatus for wireless communication, the apparatus comprising at least one means for performing the method of one or more of Aspects 50-60.

Aspect 90: A non-transitory computer-readable medium storing code for wireless communication, the code comprising instructions executable by one or more processors to perform the method of one or more of Aspects 50-60.

Aspect 91: A non-transitory computer-readable medium storing a set of instructions for wireless communication, the set of instructions comprising one or more instructions that, when executed by one or more processors of a device, cause the device to perform the method of one or more of Aspects 50-60.

Aspect 92: A device for wireless communication, the device comprising a processing system that includes one or more processors and one or more memories coupled with the one or more processors, the processing system configured to cause the device to perform the method of one or more of Aspects 50-60.

Aspect 93: An apparatus for wireless communication at a device, the apparatus comprising one or more memories and one or more processors coupled to the one or more memories, the one or more processors individually or collectively configured to cause the device to perform the method of one or more of Aspects 50-60.

Aspect 94: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 61-73.

Aspect 95: An apparatus for wireless communication at a device, the apparatus comprising one or more memories and one or more processors coupled to the one or more memories, the one or more processors configured to cause the device to perform the method of one or more of Aspects 61-73.

Aspect 96: An apparatus for wireless communication, the apparatus comprising at least one means for performing the method of one or more of Aspects 61-73.

Aspect 97: A non-transitory computer-readable medium storing code for wireless communication, the code comprising instructions executable by one or more processors to perform the method of one or more of Aspects 61-73.

Aspect 98: A non-transitory computer-readable medium storing a set of instructions for wireless communication, the set of instructions comprising one or more instructions that, when executed by one or more processors of a device, cause the device to perform the method of one or more of Aspects 61-73.

Aspect 99: A device for wireless communication, the device comprising a processing system that includes one or more processors and one or more memories coupled with the one or more processors, the processing system configured to cause the device to perform the method of one or more of Aspects 61-73.

Aspect 100: An apparatus for wireless communication at a device, the apparatus comprising one or more memories and one or more processors coupled to the one or more memories, the one or more processors individually or collectively configured to cause the device to perform the method of one or more of Aspects 61-73.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus for wireless communication at a network node, comprising: one or more memories; and one or more processors, coupled to the one or more memories, the one or more processors configured individually or collectively to cause the network node to: receive one or more uplink reference signals that are associated with a plurality of antennas at a user equipment (UE); transmit a first indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals; receive a second indication of a capability that indicates an antenna switching time delay of the UE that is associated with using the network-node-based uplink antenna selection; transmit a third indication of an uplink grant for the future uplink transmission, the uplink grant being based at least in part on the antenna switching time delay; and receive the future uplink transmission based at least in part on the antenna switching time delay.

2. The apparatus of claim 1, wherein the one or more processors, to cause the network node to transmit the first indication of the network-node-based uplink antenna selection, are configured to cause the network node to:

transmit the first indication of the network-node-based uplink antenna selection in downlink control information (DCI).

3. The apparatus of claim 2, wherein the DCI is an uplink grant DCI that indicates the uplink grant for the future uplink transmission, and wherein the uplink grant DCI indicates, in addition to the network-node-based uplink antenna selection, a transmit precoding matrix indicator (TPMI) to use for the future uplink transmission.

4. The apparatus of claim 2, wherein the one or more processors are further configured to cause the network node to:

compute a joint optimization between one or more potential antenna selections and a precoding matrix to determine the network-node-based uplink antenna selection.

5. The apparatus of claim 1, wherein the one or more processors, to cause the network node to transmit the first indication of the network-node-based uplink antenna selection, are configured to cause the network node to:

transmit the first indication of the network-node-based uplink antenna selection in at least one of:

a medium access control (MAC) control element (CE), or radio resource control (RRC) signaling.

6. The apparatus of claim 1, wherein the network-node-based uplink antenna selection indicates a plurality of antenna selections, and wherein the network-node-based uplink antenna selection indicates a respective rank for each antenna selection of the plurality of antenna selections.

7. The apparatus of claim 1, wherein the one or more processors are further configured to cause the network node to:

compute the network-node-based uplink antenna selection based at least in part on non-coherent codebook usage.

8. The apparatus of claim 7, wherein the one or more processors, to cause the network node to compute the network-node-based uplink antenna selection, are configured to cause the network node to:

optimize a signal strength metric, or optimize a balance between the signal strength metric and an antenna correlation that satisfies a low correlation threshold.

9. The apparatus of claim 1, wherein the network-node-based uplink antenna selection indicates a plurality of antenna selections, and wherein the network-node-based uplink antenna selection indicates a respective codebook type for each antenna selection of the plurality of antenna selections.

10. The apparatus of claim 1, wherein the one or more processors, to cause the network node to receive the future uplink transmission based at least in part on the antenna switching time delay, are configured to cause the network node to:

receive the future uplink transmission after expiration of the antenna switching time delay.

11. The apparatus of claim 1, wherein the uplink grant is based at least in part on an antenna switching delay value that is used to compute a physical uplink shared channel (PUSCH) preparation time.

12. The apparatus of claim 11, wherein the antenna switching delay value is based at least in part on an antenna switching state that is relative to the UE using the network-node-based uplink antenna selection.

13. The apparatus of claim 12, wherein the antenna switching state is enabled, and wherein the PUSCH preparation time is based at least in part on a non-zero value for the antenna switching time delay.

14. An apparatus for wireless communication at a user equipment (UE), comprising:

one or more memories; and one or more processors, coupled to the one or more memories, the one or more processors configured individually or collectively to cause the UE to:

transmit one or more uplink reference signals that are based at least in part on a plurality of antennas at the UE;

receive an indication of a network-node-based uplink antenna selection for the UE, the network-node-based uplink antenna selection being linked to specific precoding assigned to a future uplink transmission and being based at least in part on the one or more uplink reference signals;

receive an uplink grant that is assigned to the UE for the future uplink transmission and indicates the specific precoding; and transmit the future uplink transmission using the specific precoding, the network-node-based uplink antenna selection, and the uplink grant, wherein the uplink grant is based at least in part on an antenna switching delay value that is used to compute a physical uplink shared channel (PUSCH) preparation time.

15. The apparatus of claim 14, wherein the one or more processors, to cause the UE to receive the indication of the network-node-based uplink antenna selection, are configured to cause the UE to:

receive the indication of the network-node-based uplink antenna selection in downlink control information (DCI).

16. The apparatus of claim 15, wherein the DCI is an uplink grant DCI that indicates the uplink grant that is assigned to the UE, and wherein the uplink grant DCI indicates, in addition to the network-node-based uplink antenna selection, a transmit precoding matrix indicator (TPMI) for the future uplink transmission.

17. The apparatus of claim 14, wherein the one or more processors, to cause the UE to receive the indication of the network-node-based uplink antenna selection, are configured to cause the UE to:

receive the indication of the network-node-based uplink antenna selection in at least one of:

a medium access control (MAC) control element (CE), or radio resource control (RRC) signaling.

18. The apparatus of claim 14, wherein the network-node-based uplink antenna selection indicates a plurality of antenna selections, and wherein the network-node-based uplink antenna selection indicates a respective rank for each antenna selection of the plurality of antenna selections.

19. The apparatus of claim 14, wherein the network-node-based uplink antenna selection indicates a plurality of antenna selections, and wherein the network-node-based uplink antenna selection indicates a respective codebook type for each antenna selection of the plurality of antenna selections.

20. The apparatus of claim 14, wherein the indication of the network-node-based uplink antenna selection is a first indication, wherein the network-node-based uplink antenna selection is a proposed uplink antenna selection, and wherein the one or more processors are further configured to cause the UE to:

transmit a second indication of a UE-based antenna selection; and communicate with a network node based at least in part on the UE-based antenna selection.

21. The apparatus of claim 14, wherein the indication of the network-node-based uplink antenna selection is a first indication, and wherein the one or more processors are further configured to cause the UE to: transmit a second indication of a UE capability that indicates an antenna switching time delay of the UE that is associated with using the network-node-based uplink antenna selection; and transmit the future uplink transmission based at least in part on the antenna switching time delay.

22. The apparatus of claim 14, wherein the antenna switching delay value is based at least in part on an antenna switching state that is relative to the UE using the network-node-based uplink antenna selection.

23. The apparatus of claim 22, wherein the one or more processors are further configured to cause the UE to:

receive a fourth indication of the antenna switching state in downlink control information (DCI), wherein the antenna switching state indicates the antenna switching delay value.

24. The apparatus of claim 22, wherein the one or more processors are further configured to cause the UE to:

derive the antenna switching state and the antenna switching delay value based at least in part on a prior network-node-based uplink antenna selection indication.

25. A method of wireless communication performed by a network node, comprising: receiving one or more uplink reference signals that are associated with a plurality of antennas at a user equipment (UE); transmitting a first indication of a network-node-based uplink antenna selection for the UE, the network-node-based uplink antenna selection being linked to specific precoding assigned to a future uplink transmission, the network-node-based uplink antenna selection being based at least in part on the one or more uplink reference signals; receiving a second indication of a capability that indicates an antenna switching time delay of the UE that is associated with using the network-node-based uplink antenna selection; transmitting a third indication of an uplink grant for the future uplink transmission, the uplink grant being based at least in part on the antenna switching time delay; and receiving the future uplink transmission based at least in part on the antenna switching time delay.

26. A method of wireless communication performed by a user equipment (UE), comprising:

transmitting one or more uplink reference signals that are based at least in part on a plurality of antennas at the UE;

receiving an indication of a network-node-based uplink antenna selection for the UE, the network-node-based uplink antenna selection being linked to specific precoding assigned to a future uplink transmission and being based at least in part on the one or more uplink reference signals;

receiving an uplink grant that is assigned to the UE for the future uplink transmission and indicates the specific precoding; and transmitting the future uplink transmission using the specific precoding, the network-node-based uplink antenna selection, and the uplink grant, wherein the uplink grant is based at least in part on an antenna switching delay value that is used to compute a physical uplink shared channel (PUSCH) preparation time.

* * * * *